3,161,644
1-BENZYL-4-SUBSTITUTED PIPERIDINES
Paul Adriaan Jan Janssen, Vosselaar, near Turnhout, Belgium, assignor to Research Laboratorium Dr. C. Janssen N.V., a corporation of Belgium
No Drawing. Filed June 22, 1962, Ser. No. 204,624
9 Claims. (Cl. 260—293)

This invention relates to a new series of organic compounds generically definable as 1-benzyl-4-$R_1$-4-$NHR_2$-piperidines.

In the above general formula $R_1$ stands for cyano or carbamoyl; the group $NHR_2$ stands for anilino, alkanilino, lower alkoanilino, haloanilino, alkamino and cycloalkylamino. The abbreviations "alk" and "alko" signify lower alkyl and lower alkoxy substituents containing from 1 to 6 carbon atoms. Halo represents fluoro or, preferably, chloro. Cycloalkyl stands for cyclopentyl or cyclohexyl. Examples of $NHR_2$ groups, in addition to anilino, are: methylanilino, ethylanilino, propylanilino; methoxyanilino; ethoxyanilino and propoxyanilino; methylamino, ethylamino, propylamino and butylamino; cyclopentylamino, cyclohexylamino; fluoroanilino and chloroanilino.

The novel compounds of this invention are prepared by treating either a piperidone-4 or 4-hydroxypiperidine alkali metal sulfite, appropriately protected at the piperidyl nitrogen by, for example, a benzyl group. Condensation of either of these with a primary amine and an alkali metal cyanide causes simultaneous introduction of the nitrile and secondary amino groups in the piperidyl ring at the 4-position. The ketone is reacted in an aqueous organic carboxylic acid system such as acetic acid (glacial); the 4-hydroxypiperidine, or the ketone, in an aqueous lower alkanol such as methyl, ethyl or propyl alcohol in the presence of one equivalent of hydrochloric acid.

The novel 1-benzyl-4-$R_1$-4-$NHR_2$-piperidines are useful as intermediates for the preparation of therapeutically active compounds. In order to make such compounds, the novel piperidines are converted to the corresponding amides by acid hydrolysis, which involves nucleophilic attack of the triple bond in the nitrile group, followed by rearrangement of an activated hydrogen atom of the intermediate.

Cyclization of the resulting compound is suitably effected by treatment with formamide, in the absence or presence of an inorganic acid such as sulfuric acid, yielding the 2,4,8-triazo-spiro(4,5)dec-2-ene in cases where the secondary amino group attached to the piperidine ring is alkyl-substituted, and the 2,4,8-triaza-spiro-(4,5)decane in cases where the secondary amino group is aryl-substituted. An exception occurs when the alkyl group is ethyl, in which case the saturated spiro compound is obtained. Reaction of the carboxamide with triethoxymethane, in the presence or absence of an organic carboxylic acid/organic solvent system such as acetic acid/toluene solution, invariably affords 2,4,8-triaza-spiro-(4,5)dec-2-ene.

Ring closure of the carboxamidopiperidine is alternatively accomplished by treatment with an acylating agent, especially an anhydride of an aliphatic carboxylic acid of low molecular weight. This procedure leads to the unsaturated 2,4,8-triaza-spiro(4,5)dec-2-ene bearing a substituent at the 3-position identical to the aliphatic carboxylic acid residue of the anhydride employed.

The 3,4-di-substituted 2,4,8-triaza-spiro(4,5)dec-2-ene bearing a methyl substituent at the 3-position or the corresponding compound unsubstituted at the 3-position may be advantageously reduced to the spiro(4,5)decane by treatment with a di-light metal hydride such as lithium aluminum hydride or sodium aluminum hydride. In the case of 3-methyl-substituted dec-2-enes, debenzylation by means of hydrogen activated by palladium-on-charcoal catalyst may be carried out before or after saturation of the cyclic double bond. Other suitable reducing agents include hydrogen activated by platinum or nickel catalyst such as platinum oxide or Raney nickel as well as obvious equivalents thereof. If, however, the 3-position of the dec-2-ene is unsubstituted, saturation of the ring precedes debenzylation. In any event, the debenzylation procedure is applicable to the 2,3-substituted and unsubstituted and 4-substituted compounds, except for side reactions such as simultaneous dehalogenation if, for example, the 4-position is occupied by a haloaryl group.

Substituents may be introduced into the nitrogen group at the 2-position before or after debenzylation. Reaction with an anhydride such as one of those noted above introduces an acyl group on the nitrogen. Conversely, treatment with an alkyl halide or quaternary ammonium alkylaryl halide in the presence of a strong base such as sodamide gives the corresponding 2-alkyl-substituted compound. A hydroxyalkyl group may be introduced by reaction with the appropriate aqueous aldehyde, e.g. formaldehyde in the presence of a lower alkanol. The cyanoalkyl group is introduced into the 2-position by treatment of the appropriately substituted decane, preferably one having a benzyl group in the 8-position with an unsaturated nitrile. For example, reaction with acrylonitrile introduces the cyanoethyl group in the 2-position. The reaction is carried out in the presence of an alkali metal alkoxide at slightly elevated temperature, e.g. about 50° C., more or less, for several hours.

The benzyl group on the piperidine nitrogen following hydrogenolysis may be replaced with a variety of substituents such as alkyl, aryloxyalkyl, alkaralkyl, etc. groups by treating the spiro(4,5)decane with the halogenated reactant in the presence of an alkali metal carbonate or bicarbonate, preferably in an inert solvent medium such as a lower alkanol, e.g. methanol, ethanol, propanol or n-butanol, either singly or in admixture with another organic solvent.

If the substituent on the piperidine nitrogen is a cyanoalkyl group, reaction with an organo-metallic halide under Grignard conditions results in the replacement of the nitrile function with the corresponding keto group.

As basic catalysts one may employ alkali or alkaline earth metal carbonates, oxides or hydroxides such as sodium carbonate, or potassium carbonate; trialkylamines or heterocyclic amines.

Especially useful acylating agents are the anhydrides of aliphatic carboxylic acids of low molecular weight, e.g. acetic, propionic, or butyric.

Organic solvents of advantage in conducting the necessary reactions of this invention include hexone, benzene, toluene, xylene, heptane, tetrahydrofuran, dioxane, ether. Where appropriate, water-miscible solvents such as lower alkanols may be used, e.g. ethanol, butanol or isopropanol.

As a Grignard reagent one employs the lower alkyl magnesium halide appropriate for introduction of the desired alkyl group, e.g. methyl magnesium iodide, ethyl magnesium bromide or propyl magnesium bromide.

Aldehydes used for introduction of the hydroxyalkyl group are the aliphatic aldehydes from 1 to 5 carbon atoms—formaldehyde, acetaldehyde, propionaldehyde, butyraldehyde, and valeraldehyde.

It will be seen, therefore, that the claimed piperidines when subjected to the above-described conversions lead to a variety of compounds which possess valuable pharmacological properties. These include 1-oxo-2-$R_1$-3-$R_2$-4-$R_3$-8-$R_4$-2,4,8-triaza-spiro(4,5)decanes which have analgesic properties. Mice injected subcutaneously with compounds of this type respond to the hot plate test at doses from 1.0 mg./kg. upward. Mydriasis is evidenced at varying doses from 6.0 mg./kg. upward. Specific examples of these therapeutically useful decanes are the following:

1-oxo-4-phenyl-8-[2-(1,4 - benzodioxanyl) - methyl]-2,4,8-triaza-spiro(4,5)decane.

1-oxo-4-phenyl - 8 - benzyl - 2,4,8 - triaza-spiro(4,5)decane.

1 - oxo - 4 - phenyl-8-(4-methylbenzyl)-2,4,8-triaza-spiro(4,5)decane.

1 - oxo - 2 - methyl - 4-phenyl-8-benzyl-2,4,8-triaza-spiro(4,5)decane.

1 - oxo - phenyl - 8-(3-cyano-3,3-diphenylpropyl)-2,4,8-triaza-spiro(4,5)decane.

1 - oxo - 2 - (hydroxymethyl)-4-phenyl-8-benzyl-2,4,8-triaza-spiro(4,5)decane.

1 - oxo - 4 - phenyl-8-(2-methylbenzyl)-2,4,8-triaza-spiro(4,5)decane.

1 - oxo - 4 - phenyl-8-(4-fluorobenzyl)-2,4,8-triaza-spiro(4,5)decane.

The above-mentioned decanes are those which contain in the 8-position of the 2,4,8-triaza-spiro(4,5)decane ring substituents such as benzyl, phenylalkyl, phenoxyalkyl and hydroxy-alkoxy-alkyl. They are differentiable from 2,4,8-triaza-spiro(4,5)decanes containing in the 8-position a substituent characterized by possessing a carbonyl group such as halobenzoyl, lower alkylbenzoyl and lower alkoxy-benzoyl. Compounds which have such substituents have entirely different properties from those which do not. They are neuroleptics. In mice injected subcutaneously observable responses are obtained from 1.0 mg./kg. upward in the hot plate test of Eddy et al., J. Pharmacol., 107, 385 (1953) and 110, 135 (1954). Inhibition of apomorphine-induced vomiting in dogs is observably responsive at doses as low as 0.0005 mg./kg.

Compounds which are useful for this purpose are the following:

1 - oxo - 4 - phenyl-8-[3-(4-fluorobenzoyl)-propyl]-2,4,8-triaza-spiro(4,5)decane.

1 - oxo - 4 - phenyl-8-(3-benzoylpropyl)-2,4,8-triaza-spiro(4,5)decane.

1 - oxo - 4 - phenyl-8-[4-oxo-4-(2-thienyl)-butyl]-2,4,8-triaza-spiro(4,5)decane.

dl - 1 - oxo - 4-phenyl-8-[3-(4-fluorobenzoyl)-propyl]3-methyl-2,4,8-triaza-spiro(4,5)decane.

1 - oxo - 4 - phenyl-2-acetyl-8-[3-(4-fluorobenzoyl)-propyl]-2,4,8-triaza-spiro(4,5)decane hydrochloride.

1 - oxo - 4 - cyclohexyl-8-[3-(4-fluorobenzoyl)-propyl] 2,4,8-triaza-spiro(4,5)decane dihydrochloride.

1 - oxo - 2 - methyl-4-phenyl - 8-[3-(4-fluorobenzoyl) propyl]-2,4,8-triaza-spiro(4,5)decane hydrochloride.

1 - oxo - 4 - (4-methylphenyl)-8-[3-(4-fluorobenzoyl) propyl]-2,4,8-triaza-spiro(4,5)decane.

1 - oxo - 4 - phenyl-8-[3-(4-chlorobenzoyl)-propyl]-2,4,8-triaza-spiro(4,5)decane.

It is to be understood that the conversions described here need not necessarily follow the sequence order employed hereinabove. No restrictions are intended to be imposed regarding the manner of conversion, this being a matter entirely within the purview of one skilled in the art except for steps which are chemically prohibitive, i.e. reactions which lead to undesirable degradation.

The nomenclature employed in the compounds of this application is based upon the following nuclei:

The following examples are intended to illustrate, but not to limit, the scope of the present invention.

Example I

A mixture of 6.12 parts 1-benzyl-4-carbamoyl-4-N-anilinopiperidine and 20 parts formamide is heated for twelve hours at 170° C. After cooling, the reaction mixture is divided between 100 parts water and 900 parts chloroform. The organic layer is separated, dried over MgSO$_4$, filtered and the filtrate is evaporated. The semi-solid residue is stirred in 16 parts ethyl acetate. The undissolved part is filtered off, washed with ethyl acetate, and dried, yielding 1-oxo-4-phenyl-8-benzyl-2,4,8-triaza-spiro(4,5)decane, melting point 232–238.5° C., as a white micro-crystalline powder.

Example II

To a stirred mixture of 3.9 parts 1-oxo-4-phenyl-2,4,8-triaza-spiro(4,5)decane, 3.2 parts sodium carbonate, a few crystals of potassium iodide in 160 parts 4-methyl-2-pentanone is added dropwise a solution of 2.8 parts 1-chloro-2-phenylethane in 40 parts 4-methyl-2-pentanone. After the addition is complete, the whole is stirred and refluxed for forty-eight hours. After cooling, 100 parts water are added. A precipitate is formed, which is filtered off, yielding a first crop of crude 1-oxo-4-phenyl-8-(2-phenylethyl) - 2,4,8 - triaza-spiro(4,5)decane, melting point 198.6–201° C.

From the filtrate, the organic layer is separated, dried over MgSO$_4$, filtered and evaporated. The solid residue is washed with ether and dried, yielding 1-oxo-4-phenyl-8-(2-phenylethyl)-2,4,8 - triaza-spiro(4,5)decane, melting point 181–184.2° C., as a beige granular powder.

Example III

A mixture of 5.4 parts 4-bromo-2,2-diphenylbutyronitrile, 3.9 parts 1-oxo-4-phenyl-2,4,8-triazaspiro(4,5)decane, 3.2 parts sodium carbonate, a few crystals of potassium iodide in 200 parts 4-methyl-2-pentanone is stirred and refluxed for forty-eight hours. After cooling, 100 parts water are added. The aqueous layer is separated and extracted once more with toluene. The combined organic layers are dried over MgSO$_4$, filtered and the solvent is evaporated. The oily residue is dissolved in 80 parts diisopropylether. On keeping at room temperature, 1-oxo-4-phenyl-8-(3-cyano-3,3-diphenylpropyl) - 2,4,8-triaza-spiro(4,5)decane is obtained, melting point 178–184° C., as a pale grey granular powder.

Example IV 20 parts 1-benzyl-4-carbamoyl-4-N-(3-methylanilino)-piperidine, 45.2 parts formamide are refluxed for twenty hours. The mixture is cooled to room temperature, poured in water and extracted with 3 x 50 parts chloroform. The chloroform solutions are combined, dried over 10 parts K$_2$CO$_3$, filtered and the solvent evaporated under reduced pressure on the water bath. The oily residue is taken up in toluene, treated with charcoal, filtered, concentrated under reduced pressure and dissolved in 100 parts ether with 10 parts hexone. On cooling at −20° C., a white precipitate is formed which, after filtering with suction and drying, yields 1-oxo-4-(3-methylphenyl)-8-benzyl - 2,4,8 - triaza-spiro(4,5)decane, melting point 203.6–209.2° C., as a light tan crystalline powder.

Example V 15 parts 1-benzyl-4-carbamoyl-4-N-(4-methylanilino)-piperidine and 34.5 parts formamide are refluxed and stirred for two hours. The mixture is then poured into 100 parts water, alkalinized with excess ammonia and extracted with 3 x 50 parts chloroform. The extract is dried over 5 parts K$_2$CO$_3$, filtered and evaporated to dryness under reduced pressure on a water bath. The residue is dissolved in 90 parts ethyl acetate. The precipitate which separates at once on cooling is filtered off, dried over K$_2$CO$_3$ and weighed. The yield of 1-oxo-4-(4-methylphenyl)-8 - benzyl - 2,4,8 - triaza-spiro(4,5)decane, melting point 221.4–222.6° C., as a grey amorphous powder.

Example VI

A mixture of 4.5 parts 1-bromo-2-phenoxyethane, 4.4 parts 1-oxo-4-phenyl-2,4,8-triaza-spiro(4,5)decane, 3 parts sodium carbonate, a few crystals of potassium iodide in 200 parts 4-methyl-2-pentanone is stirred and refluxed for forty-eight hours. After cooling to room temperature, the reaction mixture is treated with 50 parts water and the layers are separated. The organic layer is dried over 5 parts $K_2CO_3$, filtered and evaporated to dryness. The solid residue is treated with 40 parts diisopropylether and yields after recrystallization from 160 parts 4-methyl-2-pentanone 1-oxo-4-phenyl-8-(2-phenoxyethyl)-2,4,8-triaza-spiro(4,5)decane, melting point 214–217.5° C., as light yellow needles.

Example VII

A mixture of 5.8 parts 2-(bromomethyl)-1,4-benzodioxane, 4.4 parts 1-oxo-4-phenyl-2,4,8-triaza-spiro(4,5)-decane, 3 parts sodium carbonate, a few crystals of potassium iodide in 200 parts 4-methyl-2-pentanone is stirred and refluxed for forty-eight hours. After cooling, 100 parts water are added. The organic layer is separated, dried and filtered. On standing of the filtrate a solid precipitated which is filtered off, yielding crude 1-oxo-4-phenyl-8-[2-(1,4-benzodioxanyl)-methyl]-2,4,8-triaza-spiro(4,5)decane. This crop is recrystallized from 100 parts toluene to yield 1-oxo-4-phenyl-8-[2-(1,4-benzodioxanyl)-methyl]-2,4,8-triaza-spiro(4,5)decane, melting point 215.8–218° C., as a white amorphous powder.

Example VIII

A mixture of 4.8 parts 1-bromo-3-phenoxypropane, 4.4 parts 1-oxo-4-phenyl-2,4,8-triaza-spiro(4,5)decane, 3 parts sodium carbonate, a few crystals of potassium iodide in 200 parts 4-methyl-2-pentanone is stirred and refluxed for forty-eight hours. After cooling, 100 parts water are added. The organic layer is separated while hot, dried, filtered and evaporated. The solid residue is stirred in diisopropylether, filtered off and dried, yielding crude 1-oxo-4-phenyl-8-(3-phenoxypropyl)-2,4,8-triaza-spiro(4,5)decane. This crop is recrystallized from a mixture of 40 parts diisopropylether and 20 parts tetrahydrofurane to yield 1-oxo-4-phenyl-8-(3-phenoxypropyl)-2,4,8-triaza-spiro(4,5)-decane, melting point 154.2–156° C., as pale beige granules.

Example IX

To a mixture of 15.5 parts 1-benzyl-4-carbamoyl-4-N-(4-chloroanilino)-piperidine and 50 parts formamide are added portionwise 20 parts sulfuric acid 98%. After addition is complete, the whole is refluxed for two hours. After cooling, the reaction mixture is decomposed with 100 parts water and alkalized with a small volume of ammonium hydroxide. The whole is extracted with chloroform. The organic layer is dried, filtered and evaporated. The residue is recrystallized from ethyl acetate to yield 1-oxo-4-(4-chlorophenyl)-8-benzyl-2,4,8-triaza-spiro(4,5)decane, melting point 209.5–214.8° C., as white microcrystals.

Example X

A mixture of 20 parts 1-benzyl-4-carbamoyl-4-N-(3-methoxyanilino)-piperidine and 40 parts formamide is stirred and refluxed for one and three-quarter hours. After cooling, the reaction mixture is decomposed with 20 parts ammonium hydroxide, 100 parts water and 150 parts chloroform. The aqueous layer is separated and extracted four times with 75 parts chloroform. The combined organic layers are dried over potassium carbonate and evaporated. The oily residue is treated with 100 parts ethyl acetate and the whole is shaken for five minutes. The formed precipitate is filtered off, washed with ethyl acetate and dried, yielding crude 1-oxo-4-(3-methoxyphenyl)-8-benzyl-2,4,8-triaza-spiro(4,5)decane. This crop is boiled for ten minutes in 60 parts ethyl acetate and filtered while hot to yield crude 1-oxo-4-(3-methoxyphenyl)-8-benzyl-2,4,8-triaza-spiro(4,5)decane. This fraction is recrystallized from 57 parts tetrahydrofuran. After cooling to 0° C., 1-oxo-4-(3-methoxyphenyl)-8-benzyl-2,4,8-triaza-spiro(4,5)decane is filtered off, melting point 212–214° C., as a white amorphous powder.

Example XI

A mixture of 20 parts 1-benzyl-4-carbamoyl-4-N-(2-methylanilino)-piperidine and 40 parts formamide is stirred and refluxed for one and three-quarter hours. After cooling, the reaction mixture is decomposed with 100 parts water and 20 parts ammonium hydroxide and extracted with 150 parts chloroform. The obtained emulsion is clarified by filtering and from the filtrate the organic layer is separated, dried over potassium carbonate and evaporated. The oily residue is dissolved in 400 parts diethylether and this solution is filtered several times until clear; the filtrate is evaporated again. The oily residue is dissolved in 48 parts ether. After cooling for a few days to $-15°$ C., 1-oxo-4-(2-methylphenyl)-8-benzyl-2,4,8-triaza-spiro(4,5)decane is obtained, melting point 151–161° C., as white shiny scales.

Example XII

A mixture of 3.5 parts 2-chloromethyl-thiophene, 5 parts 1-oxo-4-phenyl-2,4,8-triaza-spiro(4,5)decane, 4 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is stirred in diisopropylether, filtered off and dried, yielding the product. This crop is recrystallized from a mixture of chloroform and acetone, yielding 1-oxo-4-phenyl-8-(2-thienylmethyl)-2,4,8-triaza-spiro(4,5)decane, melting point 220–223° C.

Example XIII

A mixture of 3.6 parts 4-fluoro-benzylchloride, 5 parts 1-oxo-4-phenyl-2,4,8-triaza-spiro(4,5)decane, 4 parts sodium carbonate, a few crystals of potassium iodide in 200 parts 4-methyl-2-pentanone is stirred and refluxed for sixty hours. After cooling, 100 parts water are added. The organic layer is separated, dried over potassium carbonate, filtered and evaporated. The solid residue is stirred in acetone, filtered and dried, yielding 1-oxo-4-phenyl-8-(4-fluorobenzyl)-2,4,8-triaza-spiro(4,5)decane, melting point 224–234° C., as a white amorphous powder.

Example XIV

A mixture of 4.6 parts 4-methyl-benzylchloride, 5 parts 1-oxo-4-phenyl-2,4,8-triaza-spiro(4,5)decane 4 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is stirred in diethylether and dried to yield crude product. This crop is recrystallized from 56 parts acetone, yielding 1-oxo-4-phenyl-8-(4-methylbenzyl)-2,4,8-triaza-spiro(4,5)decane, melting point 182.6–185.4° C., as a pale yellow microcrystalline powder.

Example XV

A mixture of 4 parts 2-chloromethylpyridine hydrochloride, 5 parts 1-oxo-4-phenyl-2,4,8-triaza-spiro(4,5)decane, 8 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is recrystallized from a mixture of acetone and chloroform, yielding 1-oxo-4-phenyl-8-(2-pyridylmethyl)-2,4,8-triaza-spiro(4,5)decane, melting point 195–201° C., as a beige amorphous powder.

Example XVI

A mixture of 4 parts 2,5-dimethyl-benzylchloride, 5 parts 1-oxo-4-phenyl-2,4,8-triaza-spiro(4,5)decane, 4 parts sodium carbonate, a few crystals of potassium iodide in 200 parts 4-methyl-2-pentanone is stirred and refluxed for forty-eight hours. After cooling, 100 parts water are added. The precipitated solid is filtered off, yielding impure product, melting point 209.4–211° C.

From the filtrate the organic layer is separated, dried, filtered and evaporated. The solid residue is stirred in diethylether, filtered off again and dried, yielding 1-oxo-4-phenyl-8-(2,5-dimethylbenzyl)2,4,8 - triaza - spiro(4,5) decane, melting point 206–208.4° C., as a white powder.

Example XVII

Starting from 0.6 parts magnesium, 2.7 parts bromoethane and 120 parts anhydrous ether, a solution of ethyl magnesium bromide is prepared in the usual manner. To this solution is added slowly a solution of 5 parts 1-oxo-4 - phenyl - 8 - (3-cyano-3,3-diphenylpropyl)-2,4,8-triazaspiro(4,5)decane in 200 parts toluene. After the addition is complete, most of the ether is distilled off. The residue is stirred and refluxed for twenty hours. The reaction mixture is decomposed with 100 parts hydrochloric acid 2 N and then stirred and refluxed for another six hours. Three layers are obtained. After separation of the supernatant toluene layer, the remaining aqueous layer together with the oily layer is alkalized with ammonium hydroxide and the whole is extracted with chloroform. The chloroform is dried, filtered and evaporated. The solid residue is stirred in ether, filtered off and dried, yielding crude 1 - oxo - 4-phenyl-8-(3,3-diphenyl-4-oxo-hexyl)-2,4,8-triaza-spiro(4,5)decane. This crop is recrystallized from a mixture of chloroform and methanol, yielding 1 - oxo - 4-phenyl-8-(3,3,-diphenyl-4-oxo-hexyl)-2,4,8-triaza-spiro(4,5)decane, melting point 226–228° C., as a white-grey amorphous powder.

Example XVIII

To a stirred mixture of 5.1 parts 1-oxo-4-phenyl-2,4,8-triaza-spiro(4,5)decane, 7 parts sodium carbonate, a few crystals of potassium iodide in 136 parts 4-methyl-2-pentanone is added dropwise a solution of 3.7 parts 2-methyl-benzylchloride in 24 parts 4-methyl-2-pentanone. After the addition is complete, the whole is stirred and refluxed for forty-eight hours. After cooling, 150 parts water are added. The precipitate is filtered off, yielding crude 1-oxo-4-phenyl-8-(2-methylbenzyl)-2,4,8-triaza-spiro (4,5)decane. From the filtrate, the aqueous layer is separated and extracted once more with 40 parts 4-methyl-2-pentanone. The combined organic layers are dried over potassium carbonate and evaporated. The solid residue is stirred in 80 parts diisopropylether, filtered off again and dried, yielding a second fraction of impure 1 - oxo - 4-phenyl-8-(2-methylbenzyl)-2,4,8-triaza-spiro-(4,5)decane. The combined fractions are recrystallized from 56 parts 4-methyl-2-pentanone. After cooling to 0° C., 1 - oxo-4-phenyl-8-(2-methylbenzyl)-2,4,8-triaza-spiro(4,5)decane is obtained, melting point 217–219° C., as white shiny crystals.

Example XIX

A mixture of 3.6 parts 3 methyl-benzylchloride, 5 parts 1 - oxo - 4-phenyl-2,4,8-triaza-spiro(4,5)decane, 4 parts sodium carbonate, a few crystals of potassium iodide in 200 parts 4-methyl-2-pentanone is stirred and refluxed for forty-eight hours. After cooling the reaction mixture, 100 parts water are added. The whole is stirred and the formed precipitate is filtered off, yielding crude 1 - oxo - 4 - phenyl-8-(3-methylbenzyl)-2,4,8-triaza-spiro (4,5)decane. This crop is recrystallized from 80 parts 4 - methyl - 2 - pentanone, yielding 1-oxo-4-phenyl-8-(3-methylbenzyl) - 2,4,8 - triaza - spiro(4,5)decane, melting point 220–225° C., as white amorphous powder.

Example XX

To a stirred mixture of 5.1 parts 1-oxo-4-phenyl-2,4,8-triaza-spiro(4,5)decane, 7 parts sodium carbonate and a few crystals of potassium iodide in 136 parts 4-methyl-2-pentanone is added dropwise a solution of 5.25 parts 1-bromo-3-phenylpropane in 24 parts 4-methyl-2-pentanone. After the addition is complete, the whole is stirred and refluxed for forty-two hours. After cooling, 150 parts water are added. The aqueous layer is separated and extracted once more with about 40 parts 4-methyl-2-pentanone. The combined organic layers are dried over potassium carbonate and evaporated. The solid residue is stirred in about 80 parts diisopropylether and filtered off again. It is recrystallized from 56 parts 4-methyl-2-pentanone. After cooling to 0° C., the precipitate is filtered off and dried for two hours at 90° C., yielding 1-oxo-4-phenyl-8-(3-phenylpropyl)-2,4,8-triaza-spiro(4,5)decane, melting point 169.6–170.8° C., as a grey amorphous powder.

Example XXI

A mixture of 7.5 parts 4-bromo-2,2-diphenyl-butyronitrile, 5 parts 1 - oxo - 4 - methyl-2,4,8-triaza-spiro(4,5) decane hydrochloride, 8 parts sodium carbonate and a few crystals of potassium iodide in 320 parts 4-methyl-2-pentanone is stirred and refluxed for seventy-six hours. The reaction mixture is filtered and the filtrate is evaporated. The solid residue is recrystallized from 80 parts 2-propanol. The precipitate is filtered off, washed with ether and dried, yielding 1-oxo-4-methyl-8-(3-cyano-3,3-diphenylpropyl)-2,4,8 - triaza - spiro(4,5)decane, melting point 117.4–121° C., as a white powder.

Example XXII

A mixture of 102 parts 1-benzyl-4-carbamoyl-4-N-(4-methoxyanilino)-piperidine, 190 parts formamide and 54 parts sulfuric acid 98% is stirred and refluxed for one and one-half hours. After cooling, 250 parts water are added. This aqueous solution is alkalized with 50 parts ammonium hydroxide and extracted three times with 450 parts chloroform. The combined organic layers are dried over potassium carbonate and evaporated. The oily residue solidifies on stirring in 200 parts ethyl acetate, yielding 1-oxo-4-(4-methoxyphenyl)-8-benzyl-2,4,8-triazaspiro(4,5)decane, melting point 184.2–185.4° C., as a white amorphous powder.

Example XXIII

A mixture of 7.5 parts 4-bromo-2,2-diphenyl-butronitrile, 5 parts 1-oxo-4-(3-methylphenyl)-2,4,8-triaza-spiro-(4,5)decane, 4 parts sodium carbonate and a few crystals of potassium iodide in 200 parts 4-methyl-2-pentanone is stirred and refluxed for forty-eight hours. After cooling, 150 parts water are added. The organic layer is separated, dried over magnesium sulfate, filtered and evaporated. The residue is recrystallized from 80 parts boiling diethylether, yielding 1-oxo - 4 - (3-methylphenyl)-8-(3 - cyano - 3,3-diphenylpropyl)-2,4,8-triaza-spiro(4,5)decane, melting point 206–212° C., as a pale brown amorphous powder.

Example XXIV

A mixture of 7.5 parts 4-bromo-2,2-diphenylbutyronitrile, 5 parts 1-oxo-4-(4-methylphenyl)-2,4,8-triaza-spiro-(4,5)decane, 4-parts sodium carbonate and a few crystals of potassium iodide in 200 parts 4-methyl-2-pentanone is stirred and refluxed for forty-eight hours. After cooling, 150 parts water are added. The organic layer is separated, dried, filtered and evaporated. The solid residue is stirred in diethylether, filtered off again and dried, yielding 1-oxo-4-(4-methylphenyl)-8-(3-cyano-3,3-diphenylpropyl) - 2,4,8 - triaza - spiro(4,5)decane, melting point 205–211° C., as a white amorphous powder.

Example XXV

A mixture of 4.5 parts 4-bromo-2,2-diphenylbutyronitrile, 4.5 parts 1-oxo-4-cyclohexyl-2,4,8-triazaspiro(4, 5)decane dihydrochloride, 6 parts sodium carbonate and a few crystals of potassium iodide in 200 parts 4-methyl-2-pentanone is stirred and refluxed for seventy-two hours. The reaction mixture is filtered and the filtrate is evaporated. The residue is dissolved in water and the whole is extracted with chloroform. The organic layer is dried over sodium sulfate and evaporated. The residue is dissolved in a mixture of 40 parts 2-propanol and 40 parts diisopropylether. After keeping at room temperature, two fractions are obtained, a first crop of 1-oxo-4-cyclohexyl - 8 - (3 - cyano - 3,3 - diphenylpropyl) - 2,4,8 - triaza-spiro(4,5)decane contaminated with some of its hydrobromide and a second crop of 1-oxo-4-cyclohexyl-8-(3 - cyano - 3,3 - diphenylpropyl) - 2,4,8 - triaza-spiro-(4,5)decane, melting point 172.5–175° C., as a pale yellow, granular powder.

*Example XXVI*

To a stirred mixture of 5.5 parts 1-oxo-4-phenyl-2,4,8-triaza-spiro(4,5)decane, 7.5 parts sodium carbonate and a few crystals of potassium iodide in 136 parts 4-methyl-2-pentanone is added dropwise a solution of 3.5 parts 1-chloro-2(2-hydroxyethoxy)-ethane in 24 parts 4-methyl-2-pentanone. After the addition is complete, the whole is stirred and refluxed for forty-eight hours. After cooling, 150 parts water are added. The aqueous layer is separated and extracted once more with 80 parts 4-methyl-2-pentanone. The combined organic layers are dried over potassium carbonate and concentrated to a volume of 70 parts. After cooling this residue for one hour at 0° C., 1-oxo-4-phenyl-8-[2-(2-hydroxyethoxy)-ethyl]-2,4,8-triaza-spiro(4,5)decane is obtained, melting point 197.6–234° C. (dec.), as a biege amorphous powder.

*Example XXVII*

To a stirred mixture of 0.6 part lithium aluminum hydride, 48 parts benzene and 24 parts tetrahydrofurane are added, portionwise, 5.4 parts of 1-oxo-3-methyl-4-phenyl - 8 - benzyl - 2,4,8 - triaza - spiro(4,5)dec - 2 - ene. After the addition is complete, the whole is stirred and refluxed for twenty hours. After cooling, the reaction mixture is decomposed by successive addition of 50 parts water and 100 parts hydrochloric acid 1 N. Then there are added 6 parts tartaric acid. The solution is alkalized with ammonium hydroxide and extracted with chloroform. The organic layer is separated, dried over magnesium sulfate, filtered and evaporated. The oily residue is dissolved in a boiling mixture of 20 parts ethyl acetate and 160 parts diethylether and gaseous hydrogen chloride is introduced into the solution. The precipitated hydrochloride is filtered off and recrystallized from 68 parts boiling 2-propanol, yielding crude hydrochloride. This crop is dissolved in water. The aqueous solution is alkalized with ammonium hydroxide. The separated free base is filtered off and recrystallized from 24 parts boiling 4-methyl-2-pentanone. After cooling, dl-1-oxo-3-methyl-4-phenyl-8-benzyl-2,4,8-triaza-spiro(4,5)decane is filtered off, melting point 150–151.8° C., as a white granular powder.

*Example XXVIII*

A mixture of 5 parts 1-bromo-2-phenoxyethane, 5 parts 1 - oxo - 4 - (4 - methylphenyl) - 2,4,8 - triaza-spiro(4,5)-decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and on keeping the filtrate at room temperature, the product is filtered off. This crop is recrystallized from 48 parts 4-methyl-2-pentanone, yielding 1 - oxo - 4 - (4 - methylphenyl) - 8 - (2 - phenoxyethyl)-2,4,8-triaza-spiro(4,5)decane, melting point 177–177.5° C., as colorless shiny crystal needles.

*Example XXIX*

A mixture of 5 parts 1-oxo-4-phenyl-8-benzyl-2,4,8-triaza-spiro(4,5)decane, 10 parts acetic acid anhydride and 40 parts toluene is stirred and refluxed for fifteen hours. After cooling, the reaction mixture is alkalized with ammonium hydroxide. The organic layer is separated, dried over magnesium sulfate, filtered and the filtrate is concentrated to a volume of 30 parts. To this residue are added 56 parts diethylether. After keeping at room temperature, 1-oxo-2-acetyl-4-phenyl-8-benzyl-2,4,8-triaza-spiro(4,5)decane is filtered off, melting point 128–130° C., as a white amorphous powder.

*Example XXX*

A mixture of 6.4 parts 1-oxo-4-phenyl-8-benzyl-2,4,8-triaza-spiro(4,5)-decane, 0.98 part sodamide and 40 parts anhydrous toluene is stirred and refluxed until no more ammonia is evolved (in the course of about thirty minutes). After cooling, 5.4 parts N,N,N-trimethylanilinium-bromide are added. Then the whole is stirred and refluxed for sixteen hours. After cooling, 50 parts water are added. The organic layer is separated, dried over magnesium sulfate and filtered and evaporated. To the oily residue are added 50 parts water and the whole is evaporated again. This treatment is repeated three times to remove the dimethylaniline formed during the reaction. The residual water is removed by repeated azeotropic distillation with 40 parts 4-methyl-2-pentanone. The oily residue is then dissolved in a mixture of 16 parts ethyl acetate and 40 parts diethylether. After keeping at room temperature, 1-oxo-2-methyl-4-phenyl-8-benzyl-2,4,8-triaza-spiro(4,5)decane is filtered off, melting point 138–140.5° C., as white crystals. On further cooling the mother liquor at 0° C., a second fraction of less pure 1 - oxo - 2 - methyl - 4 - phenyl - 8 - benzyl - 2,4,8 - triaza-spiro(4,5)decane is obtained, melting point 136–184° C.

*Example XXXI*

A mixture of 6 parts 1-bromo-2-phenoxyethane, 6 parts 1-oxo-4-methyl-2,4,8-triaza - spiro(4,5)decane hydrochloride, 9.5 parts sodium carbonate and a few crystals of potassium iodide in 240 parts 4-methyl-2-pentanone is stirred and refluxed for forty-eight hours. The reaction mixture is filtered and evaporated. The residue is recrystallized from acetone, yielding the crude product. This crop is recrystallized from acetone, yielding 1-oxo-4-methyl-8-(2-phenoxyethyl) - 2,4,8 - triaza - spiro(4,5)decane, melting point 109.2–113.2° C., as a white-yellow granular powder.

*Example XXXII*

A mixture of 6 parts 1-oxo-4-phenyl-8-benzyl-2,4,8-triaza-spiro(4,5)decane, 10 parts formaline 37% and 48 parts 2-propanol is stirred and refluxed for sixteen hours. The reaction mixture is kept at room temperature, yielding 1-oxo-2-(hydroxymethyl)-4-phenyl-8-benzyl-2,4,8-triaza-spiro(4,5)decane, melting point 171.4–173° C., as a white amorphous powder. On further keeping the filtrate at room temperature, a second fraction of 1-oxo-2-(hydroxymethyl)-4-phenyl-8-benzyl-2,4,8 - triaza - spiro(4,5)decane is filtered off, melting point 169–170° C. (dec.).

*Example XXXIII*

A mixture of 4.5 parts 1-bromo-2-phenoxyethane, 6.7 parts 1-oxo-4-cyclohexyl-2,4,8-triaza-spiro(4.5)decane dihydrochloride, 8.5 parts sodium carbonate and a few crystals of potassium iodide in 240 parts 4-methyl-2-pentanone is stirred and refluxed for forty-eight hours. The reaction mixture is filtered and evaporated. The solid residue is recrystallized from acetone, yielding 1-oxo-4-cyclohexyl-8-(2-phenoxyethyl)-2,4,8-triaza-spiro(4,5)decane, melting point 161–162.5° C., as pale beige crystals.

*Example XXXIV*

A mixture of 6.4 parts 1-oxo-4-phenyl-8-benzyl-2,4,8-triaza-spiro(4,5)decane, 1 part sodamide and 40 parts anhydrous toluene is stirred and refluxed for one hour. Then there is added dropwise a solution of 2.2 parts ethylbromide in 40 parts anhydrous toluene to the refluxing solution. After the addition is complete, stirring and refluxing is continued for three hours. After cooling, the reaction mixture is decomposed with water. The aqueous layer is separated and extracted once more with toluene. The combined organic layers are separated, dried over magnesium sulfate, filtered and evaporated. The semisolid residue is dissolved in 160 parts ether. The solution is filtered and gaseous hydrogen chloride is introduced into the filtrate. The precipitated solid hydrochloride is filtered off and recrystallized from 24 parts 2-propanol to yield 1-oxo-2-ethyl-4-phenyl-8-benzyl-2,4,8 - triaza - spiro (4,5)decane hydrochloride, melting point 234–238° C., as a grey-white granular powder.

*Example XXXV*

A mixture of 72 parts 1-benzyl-4-carbamoyl-4-N-(ethylamino)-piperidine, 177 parts formamide and 44 parts sulfuric acid 98% is stirred and refluxed for one hour. After cooling, 200 parts water are added. The whole is alkalized with ammonium hydroxide and extracted with chloroform. The organic layer is dried over sodium sulfate, filtered and evaporated. The residue is dissolved in 120 parts ethyl acetate. After cooling for three hours at −15° C., 3 parts of an unidentified solid are filtered off. After further cooling of the mother liquor for four days at 0° C., 1-oxo-4-ethyl-8-benzyl - 2,4,8 - triaza-spiro(4,5)-decane is obtained, melting point 139–145.4° C., as a grey-white granular powder.

*Example XXXVI*

A mixture of 3.8 parts cinnamylchloride, 5 parts 1-oxo-4-phenyl-2,4,8 - triaza - spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The residue is dissolved in diethylether and filtered. After cooling at room temperature, 2.5 parts less pure product are obtained. This crop is recrystallized from 160 parts ether, yielding 1-oxo-4-phenyl-8-cinnamyl - 2,4,8 - triaza - spiro(4,5)decane, melting point 171–172.2° C., as pale beige crystals.

*Example XXXVII*

A mixture of 5 parts 1-oxo-4-phenyl-8-(3-cyano-3,3-diphenylpropyl)-2,4,8-triaza-spiro(4,5)decane, 10 parts acetic acid anhydride and 80 parts anhydrous toluene is stirred and refluxed for fifteen hours. The reaction mixture is alkalized with ammonium hydroxide. The organic layer is separated, dried, filtered and evaporated. The solid residue is recrystallized from 80 parts 4-methyl-2-pentanone, to yield 1-oxo-2-acetyl-4-phenyl-8-(3-cyano-3,3-diphenylpropyl)-2,4,8-triaza - spiro(4,5)decane, melting point 219–220.5° C., as a pale yellow amorphous powder.

*Example XXXVIII*

A mixture of 4.6 parts 1-chloro-4-phenoxybutane, 5 parts 1-oxo-4-phenyl-2,4,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The solid residue is recrystallized from 240 parts diethylether to yield the crude product. This crop is recrystallized from 80 parts 4-methyl-2-pentanone, yielding 1-oxo-4-phenyl-8-(4-phenoxybutyl)-2,4,8 - triaza-spiro(4,5)decane, melting point 85–112° C. (dec.), as a pale yellow granular powder.

EXAMPLE XXXIX

To a mixture of 6.4 parts 1-oxo-4-phenyl-8-benzyl-2,4,8-triaza-spiro(4,5)decane, 1.3 parts acrylonitrile and 40 parts dioxane is added dropwise a solution of sodium ethoxide, prepared from 0.35 part sodium in 8 parts ethanol. After the addition is complete, the whole is heated to 50° C. While maintaining this temperature, the mixture is stirred for three hours. After cooling, 50 parts water are added. The whole is extracted twice with 240 parts ether. The organic layer is separated, dried over potassium carbonate and gaseous hydrogen chloride is introduced into it. An oily hydrochloride is obtained. The solvent is decanted and the oily residue is dissolved in water. The aqueous solution is alkalized with sodium hydroxide and extracted with ether and chloroform. The combined organic solutions are dried over magnesium sulfate and gaseous hydrogen chloride is introduced into it. A sticky hydrochloride is obtained, which is dissolved in 80 parts boiling 2-propanol. After keeping for forty-eight hours at room temperature, the crude product is obtained. This crop is recrystallized from a mixture of 48 parts acetone and 8 parts 2-propanol. After cooling overnight at −20° C., 1-oxo-2-(2-cyanoethyl) - 4 - phenyl-8-benzyl-2,4,8-triaza-spiro(4, 5)decane hydrochloride is obtained, melting point 217.8–219° C., as purple shiny crystals.

EXAMPLE XL

A mixture of 6.1 parts 1-bromo-3,3-diphenylpropane, 4.6 parts 1-oxo-4-phenyl-2,4,8-triaza-spiro(4,5)decane, 3.2 parts sodium carbonate and a few crystals of potassium iodide in 200 parts 4-methyl-2-pentanone is stirred and refluxed for sixty hours. After cooling, 50 parts water are added. The organic layer is separated, dried over potassium carbonate and evaporated. The oily residue is dissolved in 40 parts acetone. This solution is poured into 400 parts diisopropylether. After filtration gaseous hydrogen chloride is introduced into the filtrate. The precipitated hydrochloride is filtered off and dried, yielding 5.2 parts crude salt. This crop is recrystallized from a boiling mixture of 80 parts 2-propanol and 40 parts acetone. The undissolved part is filtered off. After cooling the filtrate for three hours at −20° C., 1-oxo-4-phenyl - 8 - (3,3-diphenylpropyl)-2,4,8-triaza-spiro(4,5) decane hydrochloride is filtered off, melting point 247–251° C., as a pale yellow amorphous powder.

EXAMPLE XLI

A mixture of 4.3 parts 3-chloro-1,1-diphenylpropanol, 4.6 parts 1-oxo-4-phenyl-2,4,8-triaza-spiro(4,5)decane, 3.2 parts sodium carbonate and a few crystals of potassium iodide in 120 parts 4-methyl-2-pentanone is stirred and refluxed for sixty hours. After cooling, 50 parts water are added. The organic layer is separated, dried over potassium carbonate and evaporated. The solid residue is triturated in 24 parts acetone, yielding the crude product. This crop is recrystallized from a boiling mixture of 80 parts acetone and 8 parts 2-propanol. After cooling overnight at −20° C., 1-oxo-4-phenyl-8-(3,3-diphenyl - 3 - hydroxypropyl)-2,4,8-triaza-spiro(4,5) decane is obtained, melting point 226–231.5° C., as a white amorphous powder.

EXAMPLE XLII

To a stirred and refluxing solution of 4.6 parts 1-oxo-4-phenyl-2,4,8-triaza-spiro(4,5)decane, 3.2 parts sodium carbonate and a few crystals of potassium iodide in 160 parts 4-methyl-2-pentanone is added dropwise a solution of 4.4 parts 2-(2-chloroethyl)-1,4-benzodioxane in 40 parts 4-methyl-2-pentanone. After the addition is complete the whole is stirred and refluxed for sixty-five hours. After cooling, 50 parts water are added. The organic layer is separated, dried over potassium carbonate, filtered and evaporated. The oily residue is dissolved in a mixture of 120 parts acetone and 120 parts diisopropylether. This solution is filtered and gaseous hydrogen chloride is introduced into the filtrate. The solid hydrochloride is filtered off, boiled in 320 parts 4-methyl-2-pentanone, filtered off again and dried, yielding the crude product. This crop is recrystallized from 64 parts 2- propanol. On standing at room temperature a first fraction of less pure dl-1-oxo-4-phenyl-8-{2-[2-(1,4-benzodioxanyl)]-ethyl}-2,4,8-triaza-spiro(4,5)decane hydrochloride is obtained, melting point 154→220° C. On further cooling the filtrate at 0° C., another fraction of pure dl-1-oxo-4-phenyl-8-{2-[2-(1,4 - benzodioxanyl)] ethyl}-2,4,8-triaza-spiro(4,5)decane hydrochloride is filtered off, melting point 141.6→202° C. (dec.), as a brown-yellow amorphous powder.

EXAMPLE XLIII

A mixture of 3.2 parts 4-chloro-p-fluoro-butyrophenone, 3.5 parts 1-oxo-4-phenyl-2,4,8-triaza-spiro(4,5) decane, 2 parts Na$_2$CO$_3$ and 0.1 part KI in 200 parts hexone is refluxed with stirring for fifty hours. The mixture is cooled to room temperature, 200 parts water are added and the layers are separated. The organic layer is dried over 10 parts MgSO$_4$, filtered and the solvent removed under reduced pressure on the water bath. The residue is treated with 50 parts diisopropylether. The precipitate is filtered on a Buchner filter and recrystallized from 20 parts hexone at room temperature. The solid is filtered off and dried to yield 1-oxo-4-phenyl-8-[3-(4-fluorobenzoyl)-propyl] - 2,4,8 - triaza-spiro(4,5) decane, melting point 190–193.6° C., as a light brown amorphous powder.

EXAMPLE XLIV

To a stirred mixture of 5.1 parts 1-oxo-4-phenyl-2, 4,8-triaza-spiro(4,5)decane, 7 parts sodium carbonate and a few crystals of potassium iodide in 136 parts 4-methyl-2-pentanone is added dropwise a solution of 4.8 parts 4-chlorobutyrophenone in 24 parts 4-methyl-2-pentanone. After the addition is complete, the whole is stirred and refluxed for forty-eight hours. After cooling, 150 parts water are added. The aqueous layer is separated and extracted once more with 40 parts 4-methyl-2-pentanone. The combined organic layers are dried over potassium carbonate and evaporated. The solid residue is recrystallized from about 56 parts 4-methyl-2-pentanone. After cooling to 0° C., 1-oxo-4-phenyl-8-(3-benzoylpropyl) - 2,4,8 - triaza-spiro(4,5)decane is obtained, melting point 173.8–177.6° C., as a pale brown amorphous powder.

*Example XLV*

A mixture of 4.2 parts of 4-chloro-butyrothienone, 5 parts of 1-oxo-4-phenyl-2,4,8-triaza-spiro(4,5)decane, 4 parts sodium carbonate and a few crystals of potassium iodide in 200 parts 4-methyl-2-pentanone is stirred and refluxed for forty-eight hours. After cooling the reaction mixture, 100 parts water are added. The undissolved part is filtered off to yield 1-oxo-4-phenyl-8-[4-oxo-4-(2-thienyl) - butyl] - 2,4,8-triaza-spiro(4,5)decane, melting point 172.5–177° C., as a beige granular powder.

From the filtrate the organic layer is separated, dried, filtered and evaporated. The residue is recrystallized from 20 parts 4-methyl-2-pentanone, yielding crude 1-oxo - 4-phenyl-8-[4-oxo-4-(2-thienyl)-butyl]-2,4,8-triaza-spiro(4,5)decane, melting point 160.6–173° C. (dec.).

*Example XLVI*

A mixture of 5 parts 4-chloro-4'-fluoro-butyrophenone, 5 parts 4-(3-methylphenyl)-1-oxo-2,4,8-triaza-spiro(4,5)-decane, 4 parts sodium carbonate, and a few crystals of potassium iodide in 200 parts 4-methyl-2-pentanone is stirred and refluxed for forty-eight hours. After cooling the reaction mixture, 100 parts water are added. The organic layer is separated, dried, filtered and evaporated. The solid residue is stirred in diethylether, filtered off again and dried to yield crude 1-oxo-4-(3-methylphenyl)-8 - [3 - (4 - fluorobenzyl)-propyl]-2,4,8-triaza-spiro(4,5)-decane. This crop is recrystallized from a mixture of diisopropylether and tetrahydrofurane, yielding 1-oxo-4-(3 - methylphenyl)-8-[3-(4-fluorobenzoyl)-propyl]-2,4,8- triaza-spiro(4,5)decane, melting point 180.8–182.6° C., as a pale beige amorphous powder.

*Example XLVII*

A mixture of 5 parts 4-chloro-4'-fluoro-butyrophenone, 5 parts 4-(4-methylphenyl)-1-oxo-2,4,8-triaza-spiro-(4,5)-decane, 4 parts sodium carbonate and a few crystals of potassium iodide in 200 parts 4-methyl-2-pentanone is stirred and refluxed for forty-eight hours. After cooling, 50 parts water are added. The organic layer is separated, dried, filtered and the filtrate is evaporated. The solid residue is stirred in diethylether, filtered off again and dried, yielding the crude product. This crop is recrystallized from a mixture of 40 parts diisopropylether and 40 parts tetrahydrofurane, yielding 1 - oxo - 4 - (4-methylphenyl) - 8 - [3 - (4-fluorobenzoyl)-propyl]-2,4,8-triaza-spiro(4,5)decane, melting point 178–180.8° C., as a white amorphous powder.

*Example XLVIII*

A mixture of 3 parts 4,4'-dichloro-butyrophenone, 3.5 parts 1 - oxo - 4-phenyl-2,4,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The solid residue is first recrystallized from 40 parts acetone and then from 24 parts 4-methyl-2-pentanone, yielding 1-oxo-4-phenyl-8-[3-(4-chlorobenzoyl) - propyl] - 2,4,8-triaza-spiro(4,5)decane, melting point 202–203.8° C., as a pale brown amorphous powder.

*Example XLIX*

A mixture of 5 parts 4-chloro-4'-fluoro-butyrophenone, 5 parts 1-oxo-4-methyl-2,4,8-triaza-spiro(4,5)decane hydrochloride, 8 parts sodium carbonate and a few crystals of potassium iodide in 320 parts 4-methyl-2-pentanone is stirred and refluxed for forty hours. A second portion of 5 parts 4-chloro-4'-fluoro-butyrophenone is added and the whole is stirred and refluxed for another twenty-six hours. The reaction mixture is filtered and the filtrate is evaporated. The solid residue is recrystallized from 80 parts 2-propanol. After keeping at room temperature, the crude free base of 1-oxo-4-methyl-8-[3-(4-fluorobenzoyl) - propyl] - 2,4,8-triaza-spiro(4,5)decane dihydrochloride is filtered off. This crop is dissolved in chloroform. The organic layer is washed with water, dried over potassium carbonate and evaporated. The residue is dissolved in 2-propanol and gaseous hydrogen chloride is introduced into the solution. The precipitated hydrochloride is filtered off and dried, yielding 1-oxo - 4 - methyl - 8 - [3-(4-fluorobenzoyl)-propyl]-2,4,8-triaza-spiro(4,5)decane dihydrochloride, melting point 203.6–212° C., as a grey-white amorphous powder.

*Example L*

To a mixture of 2.8 parts dl-1-oxo-3-methyl-4-phenyl-2,4,8-triaza-spiro(4,5)decane, 1.8 parts sodium carbonate, and a few crystals of potassium iodide in 80 parts 4-methyl-2-pentanone is added dropwise a solution of 3 parts 4-chloro-4'-fluoro-butyrophenone in 80 parts 4-methyl-2-pentanone. After the addition is complete, the whole is stirred and refluxed for forty-eight hours. After cooling, 100 parts water are added. The organic layer is separated, dried over magnesium sulfate, filtered and the filtrate is concentrated to a volume of 60 parts, whereupon a solid is precipitated. It is filtered off and dried to yield dl-1-oxo-3-methyl-4-phenyl-8-[3-(4-fluorobenzoyl)-propyl]-2,4,8-triaza-spiro(4,5)decane, melting point 148–149.6° C., as a white amorphous powder.

*Example LI*

To a stirred mixture of 5.75 parts 1-oxo-4-(4-methoxyphenyl)-2,4,8-triaza-spiro(4,5)decane, 7 parts sodium carbonate and a few crystals of potassium iodide and 136 parts 4-methyl-2-pentanone is added dropwise a solution of 5.3 parts 4-chloro-4'-fluoro-butyrophenone in 24 parts 4-methyl-2-pentanone. After the addition is complete, the whole is stirred and refluxed for twenty-four hours. Then there is added a second portion of 2.65 parts 4-chloro-4'-fluoro-butyrophenone dissolved in 24 parts 4-methyl-2-pentanone and after this addition is complete, the whole is stirred and refluxed for another forty-eight hours. After cooling 150 parts water are added. The organic layer is separated, dried over potassium carbonate and evaporated. The solid residue is stirred in 80 parts diisopropylether, filtered off and dried, yielding crude 1-oxo - 4 - (4-methoxyphenyl)-8-[3-(4-fluorobenzoyl)-propyl]-2,4,8-triaza-spiro(4,5)decane. This fraction is recrystallized twice from 4-methyl-2-pentanone (respectively from 32 parts and 24 parts), yielding 1-oxo-4-(4-methoxyphenol) - 8 - [3-(4-fluorobenzoyl)-propyl]-2,4,8-triaza-spiro(4,5)decane, melting point 163–165° C., as a pale yellow crystalline powder.

*Example LII*

A mixture of 4.8 parts 4-chloro-4'-methyl-butyrophenone, 5 parts 1-oxo-4-phenyl-2,4,8-triaza-spiro-(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried over potassium carbonate, filtered and the filtrate is concentrated under reduced pressure, whereupon a solid is precipitated. It is filtered off, washed with diethylether and dried, yielding 1-oxo-4-phenyl-8-[3 - (4 - methylbenzoyl) - propyl] - 2,4,8 - triaza - spiro-(4,5)decane, melting point 190.6–193.8° C., as a white amorphous powder.

*Example LIII*

A mixture of 5 parts 1-oxo-4-phenyl-8-[3-(4-fluorobenzoyl) - propyl] - 2,4,8 - triaza - spiro(4,5)decane, 10 parts acetic acid anhydride and 80 parts toluene is stirred and refluxed for sixteen hours. After cooling, the reaction mixture is alkalized with ammonium hydroxide. The organic layer is separated, dried, filtered and evaporated. The oily residue is dissolved in diethylether. Then gaseous hydrogen chloride is introduced into the solution. The precipitated hydrochloride is filtered off and recrystallized from 40 parts 4-methyl-2-pentanone, yielding 1 - oxo - 2 - acetyl - 4 - phenyl - 8 - [3 - (4-fluorobenzyl) - propyl] - 2,4,8 - triaza - spiro(4,5)decane hydrochloride, melting point 188–212.5° C. (dec.), as white granules.

*Example LIV*

A mixture of 4 parts 4-chloro-4'-fluoro-butyrophenone, 3.5 parts 1-oxo-4-(2-propyl)-2,4,8-triaza-spiro(4,5)decane, 6.36 parts sodium carbonate and a few crystals of potassium iodide in 160 parts 4-methyl-2-pentanone is stirred and refluxed for twenty-four hours. Then a second portion of 2 parts 4-chloro-4'-fluoro-butyrophenone is added and the whole is stirred and refluxed for another thirty-six hours. The reaction mixture is filtered while hot and the filtrate is evaporated. The oily residue is dissolved in a mixture of 160 parts ether and 80 parts 4-methyl-2-pentanone. Gaseous hydrogen chloride is introduced into the solution. The precipitated solid hydrochloride is filtered off, yielding the product. This crop is recrystallized from a mixture of 80 parts ethanol (denatured), 80 parts acetone and 320 parts methanol. After cooling for three hours at −15° C., the precipitated solid is filtered off. This crop is dried for thirty hours at 70° C., yelding 1-oxo-4-(2-propyl)-8-[3-(4-fluorobenzoyl) - propyl] - 2,4,8 - triaza - spiro(4,5)decane dihydrochloride hemihydrate, melting point 212.6–214° C. (dec.), as a white amorphous powder.

*Example LV*

A mixture of 4.5 parts 1-oxo-4-phenyl-8-[3-(4-fluorobenzoyl) - propyl] - 2,4,8 - triaza - spiro(4,5)decane, 0.5 part sodium tetrahydridoborate, 48 parts tetrahydrofurane and 1 part distilled water is stirred and refluxed for four hours. After cooling, the reaction mixture is decomposed with diluted hydrochloric acid and alkalized with ammonium hydroxide. The aqueous layer is separated and extracted with chloroform. The combined organic layers are dried over magnesium sulfate and evaporated. The solid residue is boiled in 80 parts methanol. The undissolved part is filtered off while hot, yielding the product (mainly unreacted 1-oxo-4-phenyl - 8 - [3 - (4 - fluorobenzoyl) - propyl] - 2,4,8-triaza-spiro(4,5)decane). On cooling the filtrate at room temperature, a second fraction of 2 parts solid is filtered off. The filtrate is evaporated. This residue (0.5 part), together with the second fraction of 2 parts product is recrystallized from 16 parts 2-propanol and filtered. On keeping the filtrate at room temperature, dl - 1 - oxo - 4 - phenyl - 8 - [4 - (4 - fluorophenyl) - 4-hydroxybutyl] - 2,4,8 - triaza - spiro(4,5)decane is obtained, melting point 175.5–177° C., as a white microcrystalline powder.

*Example LVI*

A mixture of 5 parts 4-chloro-4'-methoxy-butyrophenone, 5 parts 1-oxo-4-phenyl-2,4,8-triaza-spiro(4,5)decane, 4 parts sodium carbonate and a few crystals of potassium iodide and 200 parts 4-methyl-2-pentanone is stirred and refluxed for forty-eight hours. After cooling, 100 parts water are added. The organic layer is separated, dried, filtered and evaporated. The oily residue is dissolved in 40 parts 2-propanol. After cooling to room temperature the crude product is obtained. This crop is recrystallized from 24 parts 4-methyl-2-pentanone, yielding 1 - oxo - 4 - phenyl - 8 - [3 - (4-methoxybenzoyl) - propyl] - 2,4,8 - triaza - spiro(4,5)decane, melting point 178.4–180° C., as a pale brown crystalline powder.

*Example LVII*

To a stirred and refluxing solution of 6.7 parts 1-oxo-4 - cyclohexyl - 2,4,8 - triaza - spiro(4,5)decane dihydrochloride and 8.5 parts sodium carbonate in 120 parts 4-methyl-2-pentanone is added dropwise a solution of 6 parts 4-chloro-4'-fluoro-butyrophenone in 80 parts 4-methyl-2-pentanone. After the addition is complete, the whole is stirred and refluxed for forty-eight hours. After cooling, the reaction mixture is decomposed with water. The organic layer is dried over sodium sulfate and evaporated. The residue is dissolved in anhydrous ether and gaseous hydrogen chloride is introduced into the solution. The precipitated hydrochloride is filtered off and dried, yielding the crude product. This crop is boiled in 80 parts 2-propanol. After cooling, 3.5 parts of a mixture of the mono- and dihydrochloride salt are obtained. This crop is triturated in boiling acetone and gaseous hydrogen chloride is introduced into this mixture. The obtained solid is filtered off and dried, yielding 1 - oxo - 4 - cyclohexyl - 8 - [3 - (4 - fluorobenzoyl) - propyl] - 2,4,8 - triaza - spiro(4,5)decane dihydrochloride, melting point 206–215° C. (dec.), as beige granules.

*Example LVIII*

To a stirred and refluxing solution of 6 parts 1-oxo-2-methyl-4-phenyl-2,4,8-triaza- spiro(4,5)decane hydrochloride, 4 parts sodium carbonate and a few crystals of potassium iodide in 104 parts 4-methyl-2-pentanone is added dropwise a solution of 6 parts 4-chloro-4'-fluoro-butyrophenone in 56 parts 4-methyl-2-pentanone. After the addition is complete, the whole is stirred and refluxed for forty-eight hours. After cooling, 100 parts water are added. The organic layer is separated, dried over magnesium sulfate, filtered and evaporated. The oily residue is dissolved in 160 parts diethylether and gaseous hydrogen chloride is introduced into the solution. The precipitated hydrochloride is filtered off and boiled in 56 parts 2-propanol. The undissolved part is filtered off from the hot solution and dried to yield 1-oxo-2-methyl-3-phenyl-8-[3-(4-fluorobenzoyl)-propyl]-2,4,8 - triaza - spiro(4,5) decane hydrochloride, melting point 252–254° C., as a white amorphous powder.

Example LIX

A mixture of 4.3 parts 1-chloro-5-oxo-5-phenyl-pentane, 4.6 parts 1-oxo-4-phenyl-2,4,8-triaza-spiro(4,5)-decane, 3.2 parts sodium carbonate and a few crystals of potassium iodide in 200 parts 4-methyl-2-pentanone is stirred and refluxed for sixty hours. After cooling, 50 parts water are added. The organic layer is separated, dried over potassium carbonate and evaporated. The solid residue is triturated in 24 parts acetone, yielding 1-oxo-4-phenyl-8-(4 - benzoylbutyl)-2,4,8-triaza-spiro(4,5)decane, melting point 169.5–184° C., as a pale yellow amorphous powder.

Example LX

A mixture of 4 parts 1-oxo-4-phenyl-8-[3-(4-fluorobenzoyl)-propyl]-2,4,8-triaza-spiro(4,5)decane, 6.5 parts propionic acid anhydride and 80 parts anhydrous toluene is heated to reflux. The obtained solution is stirred and refluxed for fifteen hours. The reaction mixture is filtered while hot. After cooling, the filtrate is alkalized with ammonium hydroxide. The toluene layer is separated, washed twice with a 10% potassium carbonate solution, dried over potassium carbonate, filtered and evaporated. The oily residue solidifies on treating in diisopropylether, yielding 1-oxo-2-propionyl-4-phenyl-8-[3 - (4 - fluorobenzoyl)-propyl]-2,4,8-triaza-spiro(4,5)decane, melting point 86.5–88° C., as a beige granular powder.

Example LXI

To a mixture of 44 parts 1-benzyl-4-hydroxypiperidine sodium, 70 parts water and 40 parts alcohol are added dropwise 14 parts aniline (slightly exothermic reaction). After stirring for two hours, a precipitate is formed. A solution of 9.5 parts potassium cyanide in 50 parts water is added dropwise at room temperature, whereupon the precipitate is dissolved again. After stirring overnight at room temperature, the whole is extracted with 640 parts ether, the ethereal solution is washed with about 1500 parts water, dried over $K_2CO_3$, filtered and the filtrate is evaporated. The oily residue is dissolved in anhydrous diisopropylether. After cooling for one day at —15° C., 4.5 parts of product are filtered off. This crop is recrystallized from ether and a few drops of acetone are added. After cooling overnight at —15° C., 1-benzyl-4-cyano-4-N-anilinopiperidine is filtered off, melting point 144.8–146.2° C., as shiny crystal needles.

Example LXII

A mixture of 190 parts 1-benzyl-4-oxo-piperidine, 93 parts aniline and 700 parts glacial acetic acid is cooled to 30° C. Then there is added dropwise a solution of 71.6 parts potassium cyanide in 200 parts water, at the same temperature (exothermic reaction: temperature rises to 45° C.). After the addition is complete, the whole is stirred for twenty hours at room temperature. The reaction mixture is poured into a mixture of 1300 parts ammonium hydroxide and 1000 parts crushed ice. The whole is extracted with chloroform. The organic layer is dried, filtered and evaporated. The solid residue is washed with diisopropylether and dried, yielding 1-benzyl-4-cyano-4-N-anilinopiperidine, melting point 143.5–147° C.

Example LXIII

A mixture of 5 parts 1-benzyl-4-cyano-4-N-anilinopiperidine and 60 parts sulfuric acid 90% is heated for ten minutes at 70° C. in a water bath. The water bath is removed and the whole is stirred for another hour. The reaction mixture is poured into ice-water. The aqueous solution is alkalinized with ammonium hydroxide and extracted with chloroform. The organic layer is dried over magnesium sulfate, filtered and evaporated. The solid residue is stirred in 56 parts benzene, filtered off and dried, yielding 1-benzyl-4-carbamoyl-4-N-anilinopiperidine, melting point 186.8–188.2° C., as a white amorphous powder.

Example LXIV

A mixture of 95 parts 1-benzyl-4-oxo-piperidine, 33.1 parts potassium cyanide, 50 parts methyl-amine hydrochloride, 120 parts water and 48 parts ethanol is stirred for sixty-six hours at room temperature. The reaction mixture is extracted with chloroform. The organic layer is dried over sodium sulfate and evaporated. The residue is dissolved in a mixture of 80 parts petroleum ether and 80 parts diisopropylether. After cooling to —20° C., two fractions of 1-benzyl-4-cyano-4-N-methyl-aminopiperidine are filtered off, one having a melting point 63–64° C. and the other a melting point 61.2–62° C.

Example LXV 20 parts 1-benzyl-4-cyano-4-N-methyl-aminopiperidine are added to 90 parts sulfuric acid 90% (exothermic reaction: temperature rises to 75° C.). The whole is stirred for fifty minutes. The reaction mixture is poured into ice-water. The whole is alkalinized with ammonium hydroxide while cooling: a precipitate is formed. The whole is extracted with chloroform. The organic layer is dried over potassium carbonate and evaporated. The solid residue is recrystallized from diisopropylether, filtered off and dried, yielding 1-benzyl-4-carbamoyl-4-N-methyl-aminopiperidine, melting point 156–157° C., as a white flaky powder.

Example LXVI

To a cooled mixture (30° C.) of 192 parts 1-benzyl-4-oxo-piperidine, 120.5 parts 3-methyl-aniline and 500 parts glacial acetic acid is added dropwise a solution of 81.4 parts potassium cyanide in 140 parts water, in the course of thirty minutes (exothermic reaction: temperature rises from 30° to 40° C.). The whole is stirred for two days at room temperature. The reaction mixture is poured into 1000 parts crushed ice, while stirring. The whole is alkalinized with 1200 parts ammonium hydroxide and extracted with about 3000 parts chloroform. The organic layer is dried over potassium carbonate and evaporated. The oily residue is dissolved in 320 parts diisopropylether and stirred. After cooling to 0° C., the formed precipitate is filtered off, yielding crude 1-benzyl-4-cyano-4-N - (3 - methylanilino - piperdine. This crop is purified by recrystallization from diisopropylether, yielding pure 1-benzyl-4-cyano-4-N-(3-methylanilino) - piperidine, melting point 95.5–97° C., as colorless shiny crystals.

Example LXVII

A solution of 41 parts potassium cyanide in 75 parts water is added dropwise to a stirred mixture of 96 parts 1-benzyl-4-oxo-piperidine, 69 parts 3 - methoxy - aniline and 250 parts glacial acetic acid, while maintaining a temperature of 30° to 37° C. After the addition is complete, the whole is stirred at room temperature for forty-eight hours. The reaction mixture is poured into 750 parts crushed ice. The whole is alkalinized with 600 parts ammonium hydroxide and extracted with chloroform. The organic layer is dried over potassium carbonate and evaporated. The oily residue is dissolved in 320 parts diisopropylether. On stirring this solution, a solid is precipitated. After cooling to 0° C., 1-benzyl-4-cyano-4-N-(3 - methoxy - anilino) - piperidine is obtained, melting point 97–98° C., as a white flaky powder.

Example LXVIII 134.4 parts 1-benzyl-4-cyano-4-N-(3-methyl-anilino)-piperidine are added portionwise to 915 parts concentrated sulfuric acid in three-quarters of an hour. The temperature rises to 70° C. Stirring is prolonged for two hours until complete solution is effected. The solution is added dropwise to a mixture of 1000 parts ice and 1300 parts ammonia, with stirring and cooling in an ice bath.

The alkaline mixture is extracted with 3 × 200 parts chloroform, the chloroform solutions dried over potassium carbonate, concentrated under reduced pressure on a waterbath to a volume of about 400 ml. The precipitate is filtered with suction to yield, after drying, a first crop of 1-benzyl-4-carbamoyl-4-N-(3-methyl-anilino)-piperidine, melting point 115.4–122° C. A second crop of less pure 1-benzyl-4-carbamoyl-4-N-(3-methyl-anilino)-piperidine, melting point 111–113.2° C. is obtained by concentrating the filtrate of the first crop to dryness under reduced pressure on the water bath.

Example LXIX 95 parts 1-benzy-4-oxo-piperidine, 61.5 parts 4-methyl-aniline and 260 parts glacial acetic acid are stirred together until complete solution is effected. Then 40.5 parts potassium cyanide in 100 parts water are added dropwise at 40° C. The mixture is stirred for seventy-two hours at room temperature and poured into a mixture of 650 parts concentrated ammonia and 500 parts ice. Extraction with 3 × 200 parts chloroform, drying of the collective chloroform solutions over 20 parts potassium carbonate, filtration and evaporation of the solvent under reduced pressure on the water bath yields a residue, from which, after recrystallization from 150 parts diisopropylether, 1-benzyl-4-cyano-4-N-(4-methyl-anilino)-piperidine, melting point 112–115° C. is obtained as white soft crystals.

Example LXX 80 parts 1-benzyl-4-cyano-4-N(4-methyl-anilino)-piperidine and 450 parts sulfuric acid 90% are mixed with stirring. The temperature rises quickly to 75° C. The mixture is allowed to cool slowly to room temperature, poured into excess ammoniacal ice water and extracted with 3 × 100 parts chloroform. The organic layers are collectively dried over 30 parts potassium carbonate, filtered and the solvent evaporated under reduced pressure on the water bath. The solid residue is filtered on a Buchner filter, washed with 3 × 100 parts diisopropylether and dried. 1-benzyl-4-carbamoyl-4-N-(4-methyl-anilino)-piperidine, melting point 166–167.5° C., is obtained as a white amorphous powder.

Example LXXI

A mixture of 95 parts 1-benzyl-4-oxo-piperidine, 61.5 parts 4-chloro-aniline and 260 parts acetic acid are stirred together until complete solution is effected. 40.5 parts 4-chloro-aniline are dissolved in 100 parts water and this solution is added dropwise to the acetic acid solution, an exothermic reaction ensuing. After complete addition, stirring is continued for forty-eight hours. The reaction mixture is poured into 500 parts ice and excess ammonia. Extraction with 3 × 150 parts chloroform, drying over 20 parts potassium carbonate, filtration and evaporation of the solvent under reduced pressure on the water bath yields a solid residue, which, after washing with 100 parts diisopropylether and drying, yields 1-benzyl-4-cyano-4-N-(4-chloro-anilino)-piperidine, melting point 157–159° C., as a white granular powder.

Example LXXII 96 parts 1-benzyl-4-oxo-piperidine, 60 parts 2-methyl-aniline and 260 parts glacial acetic acid are mixed while being stirred and cooled. A solution of 41 parts potassium cyanide in 70 parts water is added dropwise. An exothermic reaction raises the temperature of the mixture from 25° C. to 38° C. Stirring is continued for forty-eight hours after complete addition, after which time the reaction mixture is poured into excess ammonia and ice. The reaction product is extracted with 3 × 100 parts chloroform and the combined extracts dried over 30 parts potassium carbonate, filtered and evaporated under reduced pressure on a boiling water bath. The resulting oily residue is poured into 240 parts diisopropylether. On cooling at 0° C. for two hours, a crystalline precipitate separates. These crystals filtered off and dried, yielding 1-benzyl-4-cyano-4-N-(2-methyl-anilino)-piperdine, melting point 117–120° C., as a grey crystalline powder.

Example LXXIII 95 parts 1-benzyl-4-oxo-piperidine, 50 parts cyclohexylamine, 50 parts concentrated hydrochloric acid, 65 parts ethanol and 60 parts water are mixed while being stirred and cooled. Then a solution of 32.5 parts potassium cyanide in 40 parts water is added dropwise. Stirring is continued overnight. Then 200 parts water are added and the reaction mixture is extracted with 3 × 80 parts chloroform. The combined extracts are dried over 25 parts sodium sulfate, filtered and evaporated. The residue is dissolved in 280 parts diisopropylether. Crystallization follows practically immediately at room temperature, to yield 1-benzyl-4-cyano-4-N-cyclohexylaminopiperidine, melting point 82–83° C., as white glistening crystals.

A second crop of 1-benzyl-4-cyano-4-N-cyclohexyl-aminopiperidine, melting point 76–79° C., is obtained after further keeping the mother liquor at room temperature. Also a third and a fourth crop are obtained having, respectively, melting point 78–79° C. and melting point 73.4–74.8° C.

Example LXXIV 20 parts 1-benzyl-4-cyano-4-N-cyclohexylaminopiperidine are added portionwise to 110 parts sulfuric acid 90% in fifteen minutes. The temperature rises to 80° C. Stirring is prolonged for one hour until complete solution is effected. The mixture is allowed to cool to room temperature, poured into excess ammoniacal ice water and extracted with 3 × 75 parts chloroform. The combined organic layers are dried over 15 parts potassium carbonate, filtered and the solvent is evaporated under reduced pressure on the water bath. The solid residue is washed with 3 × 50 parts diisopropylether, filtered and dried to yield 1-benzyl-4-carbamoyl-4-N-cyclohexylaminopiperidine, melting point 138.8–139.6° C., as a white amorphous powder.

A second crop of 1-benzyl-4-carbamoyl-4-N-cyclohexylaminopiperidine is obtained by further crystallization of the mother liquor at room temperature, melting point 147–148° C.

Example LXXV 58 parts 1-benzyl-4-N-(4-chloro-anilino)-4-cyanopiperidine are added portionwise to 276 parts sulfuric acid 90% (exothermic reaction). After the addition is complete, the whole is heated to 70° C. for ten minutes. Then the whole is slowly cooled to room temperature, in the course of about one hour. The reaction mixture is poured into an excess ammoniacal ice water and the whole is extracted with chloroform. The chloroform-extract is separated, dried, filtered and evaporated. The solid residue is stirred in dissopropylether, filtered off again and dried, to yield 1-benzyl-4-carbamoyl-4-N-(4-chloro-anilino)-piperidine, melting point 172–173° C., as a white granular powder.

Example LXXVI

To 400 parts sulfuric acid 98% are added portionwise, in the course of twenty minutes, 64 parts 1-benzyl-4-cyano-4-N-(3-methoxy-anilino)piperidine, while stirring (exothermic reaction: the temperature rises from 20° to 60° C.). Stirring is continued for ten minutes at 70° C., whereupon the reaction mixture is cooled to room temperature, while stirring, in the course of two hours. The whole is poured into 750 parts ammonium hydroxide and 750 parts crushed ice. The mixture is extracted with chloroform. The organic layer is dried over postassium carbonate and then evaporated. The oily residue is dissolved in 160 parts toluene. After cooling to 0° C., 1-benzyl-4-carbamoyl-4-N-(3-methoxy-anilino)-piperidine is filtered off, melting point 130–131° C.

Example LXXVII

To 375 parts sulfuric acid 98% are added portionwise 47 parts 1-benzyl-4-cyano-4-N-(2-methyl-anilino)-piperidine, in the course of thirty minutes, while stirring. After the addition is complete, the whole is stirred first at room temperature for fifteen minutes while cooling (exothermic reaction: temperature rises from 15° to 43° C.), and then at a temperature of 70° C. for fifteen minutes. After cooling to room temperature, the mixture is poured into a mixture of 1000 parts ammonium hydroxide and 1000 parts crushed ice. The whole is extracted with 2000 parts chloroform. The organic layer is separated, dried over potassium carbonate and evaporated. On treating the oily residue with 240 parts diisopropylether, a precipitate is formed. After cooling overnight at 0° C., 1-benzyl-4-carbamoyl-4-N-(2-methyl-anilino)-piperidine is filtered off, melting point 126–128° C.

Example LXXVIII

To a stirred mixture of 95 parts 1-benzyl-4-oxo-piperidine, 36.5 parts n-butylamine and 48 parts ethanol are added dropwise 50 parts concentrated hydrochloric acid at a temperature below 20° C. (ice bath). After the addition is complete, there is added dropwise a solution of 33.1 parts potassium cyanide in 120 parts water, while maintaining this temperature. After the addition is complete, the whole is stirred for thirty-six hours at room temperature. Then there are added 200 parts water and the whole is extracted with chloroform. The organic layer is washed with 500 parts water, dried over sodium sulfate, filtered and evaporated. The residue is dissolved in a mixture of 80 parts ether and 560 parts petroleum ether. After cooling for two days at −15° C., crude 1-benzyl-4-cyano-4-N-(butylamino)-piperidine is filtered off.

On further keeping the mother liquor at room temperature for two days a second crop and a third crop of the final product are obtained, having, respectively, melting point 75–77° C., as white crystals and melting point 69.9–78.2° C.

Example LXXIX

To 108 parts sulfuric acid 98% are added portionwise 20 parts 1-benzyl-4-cyano-4-N-(butylamino)-piperidine, in the course of two minutes, while stirring (exothermic reaction: temperature rises to 60° C.). After the addition is complete, the whole is heated at 80° C. for one hour while stirring and then cooled to room temperature. The reaction mixture is poured into ice and ammonium hydroxide. An oil is precipitated. The whole is extracted with chloroform. The organic layer is dried over potassium carbonate, filtered and evaporated. The residue is dissolved in 40 parts diisopropylether. After cooling overnight at −15° C., crude 1-benzyl-4-carbamoyl-4-N-(butylamino)-piperidine is obtained. A sample of 3 parts is recrystallized from 24 parts isopropanol. After cooling overnight at −15° C., 1-benzyl-4-carbamoyl-4-N-(butylamino)-piperidine is filtered off, melting point 114–118° C., as a white amorphous powder.

Example LXXX

A mixture of 950 parts 1-benzyl-4-oxo-piperidine, 694 parts of 4-methoxy-aniline and 2500 parts glacial acetic acid is cooled to 25° C. Then there are added dropwise 405 parts potassium cyanide in 800 parts water. After the addition is complete, the whole is stirred for forty-eight hours at room temperature. The reaction mixture is poured into a mixture of 5000 parts crushed ice and 5000 parts ammonium hydroxide. The whole is extracted with 11,000 parts chloroform. The organic layer is separated, dried and evaporated. The residue is recrystallized from ether to yield 1-benzyl-4-cyano-4-N-(4-methoxyanilino)-piperidine, melting point 110–117° C.

Example LXXXI

To 4860 parts sulfuric acide 98% are added portionwise 1020 parts 1-benzyl-4-cyano-4-N-(4-methoxyanilino)-piperidine (exothermic reaction: temperature rises to 80° C.). After the addition is complete, the reaction mixture is cooled to 60° C., then poured into a mixture of 12,000 parts crushed ice to which 14,000 parts ammonium hydroxide are added. The whole is extracted with chloroform while hot. The organic layer is separated, dried over sodium sulfate, filtered and evaporated. The oily residue is poured into 800 parts diisopropylether. The precipitated solid is filtered off and triturated in diisopropylether, to yield 1-benzyl-4-carbamoyl-4-N-(4-methoxyanilino)-piperidine, melting point 131–134° C.

Example LXXXII

To a mixture of 95 parts 1-benzyl-4-oxo-piperidine and 48 parts denaturated ethanol are added portionwise 22.5 parts ethylamine, at a temperature below 20° C. (cooling with an ice bath). While maintaining this temperature, there are added first 50 parts concentrated hydrochloric acid, followed by 33.1 parts potassium cyanide and 120 parts water. After the addition is complete, the whole is stirred for five days at room temperature. The reaction mixture is poured into 400 parts water. The whole is extracted with chloroform. The organic layer is washed with 1000 parts water, dried over potassium carbonate, filtered and evaporated. The oily residue is dissolved in 240 parts petroleum ether. After cooling for twenty-four hours at −15° C., crude 1-benzyl-4-cyano-4-N-(ethylamino)-piperidine is obtained. This crop is recrystallized from 40 parts ether. After cooling to 0° C., 1-benzyl-4-cyano-4-N-(ethylamino)-piperidine is obtained, melting point 55–56° C., as shiny crystals.

Example LXXXIII

To a mixture of 95 parts 1-benzyl-4-oxo-piperidine and 48 parts denaturated ethanol are added portionwise 53 parts isopropylamine hydrochloride, at a temperature below 20° C. (cooling with ice-bath). While maintaining this temperature, there are added 33.1 parts potassium cyanide in 120 parts water. After the addition is complete, the whole is stirred at room temperature. After about fifteen minutes a solid mass is obtained. Then there are added 48 parts ethanol and 120 parts water. After further stirring overnight at room temperature, the reaction mixture is diluted with 200 parts water. The whole is extracted with chloroform. The organic layer is separated, washed with 1000 parts water, dried over sodium sulfate, filtered and evaporated. The residue is dissolved in 400 parts petroleum ether. After keeping overnight at room temperature, crude 1-benzyl-4-cyano-4-N-(2-propylamino)-piperidine is obtained. This crop is recrystallized from 48 parts ether. After cooling to 0° C., 1-benzyl-4-cyano-4-N-(2-propylamino)-piperidine is filtered off, melting point 64–67° C., as a white amorphous powder.

On keeping the first mother liquor for two days at room temperature, a second fraction of less pure 1-benzyl-4-cyano-4-N-(2-propylamino)-piperidine is obtained, melting point 59–64° C.

Example LXXXIV 66 parts 1-benzyl-4-cyano-4-N-(ethylamino)-piperidine are added portionwise to 432 parts sulfuric acid 98% (exothermic reaction: temperature rises from 16° to 81° C.). After the addition is complete, the whole is stirred for one hour. The reaction mixture is poured into a mixture of crushed ice and ammonium hydroxide. The whole is extracted with chloroform. The organic layer is separated, dried over potassium carbonate, filtered and evaporated under reduced pressure. The residue is triturated in ether, yielding 1-benzyl-4-carbamoyl-4-N-(ethylamino)-piperidine, melting point 113.6–115.4° C.

On recrystallization of a sample of this crop from a mixture of 24 parts ether and 40 parts ethanol, the compound has a melting point of 115.2–119.2° C., as white crystals.

Example LXXXV 64 parts 1-benzyl-4-cyano-4-N-(2-propylamino)-piperidine are added portionwise to 434 parts sulfuric acid 98%, while stirring (exothermic reaction: temperature rises from 18° to 79° C.). After the addition is complete, the whole is stirred for one hour. The reaction mixture is poured into a mixture of crushed ice and ammonium hydroxide. The whole is extracted with chloroform. The organic layer is dried over potassium carbonate, filtered and the filtrate is evaporated, yielding 52 parts crude product. This crop is recrystallized from a mixture of 24 parts ether and 40 parts ethanol. After cooling for two days to −15° C., 1-benzyl-4-carbamoyl-4-N-(2-propylamino)-piperidine is obtained, melting point 117.8–120.4° C., as white shiny crystals.

Example LXXXVI

To a stirred mixture of 95 parts 1-benzyl-4-oxo-piperidine, 29.5 parts propyl amine and 48 parts denatured ethanol are added dropwise 50 parts concentrated hydrochloric acid at a temperature below 20° C. After the addition is complete and while keeping the temperature below 20° C., there is added dropwise a solution of 33.1 parts potassium cyanide in 120 parts water. After the addition is complete, the whole is stirred for three days at room temperature. The reaction mixture is poured into 200 parts water and then extracted with chloroform. The organic layer is washed with water, dried over potassium carbonate, filtered and evaporated. An oily residue of crude 1-benzyl-4-cyano-4-N-(propylamino)-piperidine is obtained. It is used without further purification for preparing 1-benzyl-4-carbamoyl-4-N-(propylamino)-piperidine.

Example LXXXVII

To 165 parts sulfuric acid 98% are added 25.7 parts 1-benzyl-4-cyano-4-N-(propylamino)-piperidine while stirring (exothermic reaction: temperature rises from 18° to 82° C.). The whole is stirred for one hour (temperature falls to 26° C.). The reaction mixture is poured into a mixture of crushed ice and ammonium hydroxide. The whole is extracted with chloroform. The organic layer is separated, dried over potassium carbonate, filtered and evaporated under reduced pressure. The residue is dissolved in ether. After keeping at room temperature, 1-benzyl-4-carbamoyl-4-N-(propylamino)-piperidine is filtered off, melting point 128–131° C., as a white crystalline powder.

Example LXXXVIII

A mixture of 6.2 parts 1-benzyl-4-carbamoyl-4-N-anilinopiperidine, 3.1 parts actic acid anhydride and 40 parts anhydrous toluene is stirred and refluxed for sixteen hours. After cooling the reaction mixture is decomposed with water, followed by addition of ammonium hydroxide. The aqueous layer is separated and extracted once more with toluene. The combined organic layers are dried over potassium carbonate and evaporated. The oily residue is dissolved in 200 parts diethylether. This solution is filtered several times, until clear and then hydrogen chloride gas in introduced into the filtrate. The precipitated hydrochloride is filtered off and stirred in a warm mixture of acetone and isopropanol. The undissolved part is filtered off, yielding 1.5 parts product. From this crop the free base is liberated in the usual manner. After extraction with benzene, the organic layer is dried and evaporated. The residue is washed with ether and dried, yielding 1-oxo-3-methyl-4-phenyl-8-benzyl-2,4,8-triaza-spiro(4,5)dec-2-ene, melting point 211.5–214.5° C., as a beige, crystalline powder.

Example LXXXIX

A mixture of 9.8 parts 1-benzyl-4-carbamoyl-4-N-methylaminopiperidine and 60 parts triethoxy-methane is refluxed for eighteen hours with stirring. The reaction mixture is evaporated to dryness under reduced pressure on the water bath and the residue taken up in 90 parts boiling ethyl acetate. The precipitate is filtered on a Buchner filter and dried to yield 1-oxo-4-methyl-8-benzyl-2,4,8-triaza-spiro(4,5)dec-2-ene, melting point 178–179.5° C., as glistening crystals.

A second crop of less pure 1-oxo-4-methyl-8-benzyl-2,4,8-triaza-spiro(4,5)dec-2-ene is obtained after cooling the mother liquor overnight at −5° C., melting point 175–178.5° C.

Example XC

A mixture of 14.9 parts 1-oxo-3-methyl-4-phenyl-8-benzyl-2,4,8-triaza-spiro(4,5)dec-2-ene and 160 parts ethanol 95% is debenzylated at normal pressure and at a temperature of 37–39° C., in the presence of 5 parts palladium-on-charcoal catalyst 10%. After the calculated amount of hydrogen is taken up, hydrogenation is stopped. The catalyst is filtered off, washed with 2 x 50 parts ethanol and the combined ethanol solutions are evaporated. The solid residue, after washing with 150 parts ether, and drying, yields 1-oxo-3-methyl-4-phenyl-2,4,8-triaza-spiro(4,5)dec-2-ene, melting point 197.4–205° C.

Example XCI

A mixture of 66.7 parts 1-benzyl-4-carbamoyl-4-N-anilinopiperidine, 30 parts triethoxy-methane, 280 parts toluene and 16 parts glacial acetic acid is stirred and refluxed for thirty-eight hours. After cooling, the reaction mixture is decomposed with 20 parts ammonium hydroxide and 50 parts water. The organic layer is separated, dried over magnesium sulfate and filtered. On standing, a precipitate is formed, which is filtered off and dried, yielding 4 parts of "1-benzyl-4-carbamoyl-4-N-anilinopiperidine." The mother liquor is concentrated to a volume of about 120 parts. After keeping at room temperature, 45 parts crude product are obtained. This crop is dissolved in 48 parts toluene. After cooling to room temperature, 1-oxo-4-phenyl-8-benzyl-2,4,8-triaza-spiro(4,5)dec-2-ene is obtained, melting point 171.2–173.2° C., as yellow shiny crystals.

Example XCII

A mixture of 15 parts 1-benzyl-4-carbamoyl-4-N-cyclohexyl-amino-piperidine, 15 parts triethoxy-methane, 120 parts toluene and 4 parts glacial acetic acid is stirred and refluxed for forty-two hours. After cooling the reaction mixture is evaporated. The residue is dissolved in water. The aqueous solution is alkalinized with ammonium hydroxide and extracted with chloroform. The organic layer is dried over sodium sulfate and evaporated. The residue is recrystallized twice from ethyl acetate, to yield 1-oxo-4-cyclohexyl-8-benzyl-2,4,8-triaza-spiro(4,5)dec-2-ene, melting point 209–211.4° C.

Example XCIII

A mixture of 9 parts 1-benzyl-4-carbamoyl-4-N-cyclohexylamino-piperidine, 18 parts formamide and 5.4 parts sulfuric acid 98% is heated for three hours at 200° C. After cooling the reaction mixture is poured into water. The aqueous solution is alkalinized with ammonium hydroxide and the whole is extracted with chloroform. The organic layer is dried over sodium sulfate and evaporated. The residue is recrystallized from ethyl acetate to yield the crude product. This crop is crystallized from 24 parts ethyl acetate, yielding 1-oxo-4-cyclohexyl-8-benzyl-2,4,8-triaza-spiro(4,5)dec-2-ene, melting point 208.2–210.8° C.

Example XCIV

A mixture of 27.5 parts 1-benzyl-4-carbamoyl-4-N-(2-propylamino)-piperidine, 55 parts triethoxymethane, 80 parts toluene and 10 parts glacial acetic acid is stirred and refluxed for two days. After cooling, the reaction mixture is evaporated. The oily residue is alkalinized with sodium hydroxide and then extracted with chloroform. The organic layer is separated, dried over potassium carbonate, filtered and evaporated. The residue is boiled in ethyl acetate. After cooling for one hour at 0° C., 1-oxo-4-(2-propyl)-8-benzyl-2,4,8-triaza-spiro(4,5)dec-2-ene is filtered off, melting point 192.6–194° C., as white crystals.

*Example XCV*

A mixture of 26 parts 1-benzyl-4-carbamoyl-4-N-(butylamino)-piperidine, 50 parts triethoxy-methane, 80 parts toluene and 9 parts glacial acetic acid is stirred and refluxed for two days. After cooling the reaction mixture is evaporated under reduced pressure. The residue is alkalinized and extracted with chloroform. The organic layer is separated, dried over potassium carbonate, filtered and evaporated. The residue is recrystallized from 80 parts ethyl acetate, yielding 14 parts product. This crop is recrystallized from 160 parts ethyl acetate, yielding 9.5 parts product. This crop is dissolved in a mixture of 160 parts anhydrous ether and 40 parts 2-propanol and gaseous hydrogen chloride is introduced into the solution. After cooling overnight at 0° C., 1-oxo-4-butyl-8-benzyl-2,4,8-triaza-spiro(4,5)dec-2-ene-dihydrochloride is filtered off, melting point 265–267.5 C., as a white granular powder.

*Example XCVI*

A mixture of 20 parts 1-oxo-4-phenyl-8-benzyl-2,4,8-triaza-spiro(4,5)decane, 200 parts methanol, 40 parts isopropanol and 7 parts concentrated hydrochloric acid is debenzylated at normal pressure and at a temperature of 38° to 40° C., in the presence of 10 parts palladium-on-charcoal catalyst. After the calculated amount of hydrogen is taken up, hydrogenation is stopped. The catalyst is filtered off and the solvent is evaporated. The residue is dissolved in water. This aqueous solution is alkalinized with ammonium hydroxide and extracted with chloroform. The organic layer is dried over magnesium sulfate, filtered and evaporated. The solid residue is washed with ether, filtered off and dried, yielding 1-oxo-4-phenyl-2,4,8-triaza-spiro(4,5)decane, melting point 168–176° C.

*Example XCVII*

A mixture of 18 parts 1-oxo-4-methyl-8-benzyl-2,4,8-triaza-spiro(4,5)dec-2-ene, 40 parts 2-propanol, 200 parts methanol and 7 parts hydrochloric acid 35% is debenzylated at normal pressure and at a temperature of 27° C., in the presence of 10 parts palladium-on-charcoal catalyst. After the calculated amount of hydrogen is taken up, hydrogenation is stopped. The charcoal is filtered off and the filtrate is evaporated. The residue is recrystallized from boiling acetone, the formed precipitate is filtered off again and dried, yielding 13 parts product. This crop is boiled once more in 240 parts 2-propanol, filtered and dried, yielding 1-oxo-4-methyl-2,4,8-triaza-spiro(4,5)dec-ane-hydrochloride, melting point 200–203° C., as a white amorphous powder.

On keeping the mother liquor at room temperature, a second less pure crop of 1-oxo-4-methyl-2,4,8-triaza-spiro(4,5)-decane-hydrochloride is filtered off, melting point 185.6–191° C.

*Example XCVIII*

A mixture of 35 parts 1-oxo-4-(4-methyl-phenyl)8-benzyl-2,4,8-triaza-spiro(4,5)decane, 320 parts methanol and 20 parts concentrated hydrochloric acid is debenzylated at normal pressure and at a temperature of about 50° C., in the presence of 10 parts palladium-on-charcoal catalyst. After the calculated amount of hydrogen is taken up, hydrogenation is stopped. The charcoal is filtered off and the filtrate is evaporated. The solid residue is dissolved in water. The aqueous solution is alkalinized with ammonium hydroxide and extracted with warm chloroform. The organic layer is separated, dried, filtered and evaporated. The solid residue is stirred in diethylether, filtered off again and dried, yielding 1-oxo-4-(4-methyl-phenyl)-2,4,8-triaza-spiro(4,5)decane, melting point 190–191.4° C., as a pale-grey, amorphous powder.

*Example XCIX*

A mixture of 24 parts 1-oxo-4-(3-methyl-phenyl)-8-benzyl-2,4,8-triaza-spiro(4,5)decane, 320 parts methanol and 20 parts concentrated hydrochloric acid is debenzylated at normal pressure and at a temperature of about 50° C., in the presence of 10 parts palladium-on-charcoal catalyst. After the calculated amount of hydrogen is taken up, hydrogenation is stopped. The catalyst is filtered off and extracted with boiling water. The combined filtrates are evaporated and to the solid residues is added a small volume of ammonium hydroxide and the mixture is extracted with chloroform. The organic layer is separated, dried, filtered and evaporated. The solid residue is stirred in diisopropylether, filtered off and dried, yielding 1-oxo-4-(3-methyl-phenyl)-2,4,8-triaza-spiro(4,5)dec-ane, melting point 189.8–190.8° C.

*Example C*

A mixture of 19.7 parts 1-oxo-4-(4-methoxy-phenyl)-8-benzyl-2,4,8-triaza-spiro(4,5)decane, 200 parts hydrogen and 20 parts denaturated ethanol is debenzylated at normal pressure and at a temperature of about 40° C., in the presence of 7 parts palladium-on-charcoal catalyst. After the calculated amount of hydrogen is taken up, hydrogenation is stopped. Then 200 parts water are added. The catalyst is filtered off and the filtrate is concentrated under diminished pressure. The residue is alkalinized with ammonium hydroxide. The whole is extracted with about 1500 parts chloroform. The organic layer is dried over potassium carbonate and concentrated to a volume of about 60 parts. During this evaporation a solid is precipitated. It is filtered off and dried to yield 1-oxo-4-(4-methoxy-phenyl)-3,4,8-triaza-spiro(4,5)decane, melting point 195–196° C., as a white micro-crystalline powder.

*Example CI*

A mixture of 22 parts 1-oxo-4-cyclohexyl-8-benzyl-2,4,8-triaza-spiro(4,5)dec-2-ene, 160 parts methanol, 245 parts 2-propanol and 7 parts concentrated hydrochloric acid is hydrogenated at normal pressure and at room temperature, in the presence of 15 parts palladium-on-charcoal catalyst 10%. After the calculated amount of hydrogen (2 moles) is taken up, hydrogenation is stopped. The catalyst is filtered off. After keeping the filtrate at room temperature, a solid is precipitated. It is filtered and dried, to yield crude 1-oxo-4-cyclohexyl-2,4,8-triaza-spiro(4,5)decane dihydrochloride, melting point 205–220° C.

*Example CII*

A mixture of 9 parts 1-oxo-3-methyl-4-phenyl-2,4,8-triaza-spiro(4,5)dec-2-ene and 80 parts methanol is hydrogenated at normal pressure and at a temperature of about 37° C., in the presence of 0.2 parts platinum oxide as catalyst (Adams catalyst). After the calculated amount of hydrogen is taken up, hydrogenation is stopped. The catalyst is filtered off. After cooling the filtrate to 0° C., dl-1-oxo-3-methyl-4-phenyl-2,4,8-triaza-spiro(4,5)decane is filtered off, melting point 196.2–199.2° C.

The mother liquor is concentrated to a volume of about 30 parts, whereupon a solid is precipitated. The whole is diluted with 40 parts 2-propanol. The product is filtered off, yielding a second fraction of dl-1-oxo-3-methyl-4-phenyl-2,4,8-triaza-spiro(4,5)decane, melting point 196–197.5° C.

*Example CIII*

A mixture of 13 parts 1-oxo-2-methyl-4-phenyl-8-benzyl-2,4,8-triaza-spiro(4,5)-decane 80 parts methanol and 24 parts 2-propanol is debenzylated at normal pressure and at a temperature of about 35° C., in the presence of 4 parts palladium-on-charcoal catalyst. After the calculated amount of hydrogen is taken up, hydrogenation is stopped. The catalyst is filtered off and the filtrate is evaporated. The oily residue is dissolved in 56 parts ethyl acetate, whereupon a solid fraction is obtained. This is filtered off, yielding 1 part of crude free base of 1-oxo-2-methyl-4-phenyl-2,4,8-triza-spiro (4,5)decane-hydrochloride. The filtrate is diluted with 80 parts diethylether and gaseous hydrogen chloride is introduced into the solution. The precipitated hydrochloride is filtered off and dissolved in 48 parts 2-propanol. The dissolved part is filtered off, yielding 1-oxo-2-methyl-4 - phenyl - 2,4,8 - triaza - spiro(4,5)decane - hydrochloride, melting point 205–209° C., as a white microcrystalline powder.

*Example CIV*

A mixture of 20 parts of 1-oxo-4-(2-propyl)-8-benzyl-2,4,8-triaza-spiro(4,5)dec-2-ene, 160 parts 2-propanol, 200 parts distilled water and 15 parts concentrated hydrochloric acid is hydrogenated at normal pressure and at a temperature of about 30° C., in the presence of 7 parts palladium-on-charcoal catalyst. After the calculated amount of hydrogen is taken up, hydrogenation is stopped. The catalyst is filtered off and the filtrate is evaporated. The residue is alkalinized with sodium hydroxide and extracted with chloroform. The organic layer is dried, filtered and evaporated, yielding 1-oxo-4-(2-propyl)-2,4,8-triaza-spiro(4,5)decane, melting point 158–161° C.

What is claimed is:

1. 1-benzyl-4-$R_1$-4-$NHR_2$-piperidine wherein $R_1$ is a member selected from the group consisting of cyano and carbamoyl and $NHR_2$ is a member selected from the group consisting of anilino, lower alkylanilino, lower alkoxyanilino, chloroanilino, lower alkylamino, cyclohexylamino and haloanilino, the lower alkyl and lower alkoxy substituents containing from 1 to 6 carbon atoms.
2. 1-benzyl-4-cyano-4-N-anilinopiperidine.
3. 1-benzyl-4-carbamoyl-4-N-anilinopiperidine.
4. 1 - benzyl - 4 - cyano - 4 - N - (3 - methylanilino)-piperidine.
5. 1 - benzyl - 4 - carbamoyl - 4 - N - (3 - methylanilino)-piperidine.
6. 1-benzyl-4-cyano-4-N-methyl-aminopiperidine.
7. 1-benzyl-4-carbamoyl-4-N-methylaminopiperidine.
8. 1-benzyl-4-cyano-4-N-(2-propylamino)-piperidine.
9. 1 - benzyl - 4 - carbamoyl - 4 - N - (2-propylamino)-piperidine.

No references cited.

UNITED STATES PATENT OFFICE
CERTIFICATE OF CORRECTION

Patent No. 3,161,644　　　　　　　　　　　　　December 15, 1964

Paul Adriaan Jan Janssen

It is hereby certified that error appears in the above numbered patent requiring correction and that the said Letters Patent should read as corrected below.

Column 3, line 13, for "1-oxo-phenyl-" read -- 1-oxo-4-phenyl- --; column 10, line 62, for "(4.5)" read -- (4,5) --; column 15, line 66, for "(denatured)" read -- (denaturated) --; column 16, line 1, for "bonzoyl)-" read -- benzoyl)- --; column 18, line 46, for "-methylanilino-piperdine" read -- -methylanilino)-piperdine --; column 23, line 51, for "actic" read -- acetic --; line 60, for "in" read -- is --; column 26, line 34, for "-3,4,8-" read -- -2,4,8- --; column 27, line 3, for "-triza-" read -- -triaza- --; line 8, for "dissolved" read -- undissolved --; same column 27, line 13, strike out "of".

Signed and sealed this 6th day of July 1965.

(SEAL)
Attest:

ERNEST W. SWIDER　　　　　　　　　　　　　　　EDWARD J. BRENNER
Attesting Officer　　　　　　　　　　　　　　　Commissioner of Patents